US006302532B1

(12) United States Patent
Ishinaga et al.

(10) Patent No.: US 6,302,532 B1
(45) Date of Patent: Oct. 16, 2001

(54) METHOD OF MANUFACTURING AN INK CONTAINER

(75) Inventors: Hiroyuki Ishinaga, Tokyo; Kazuaki Masuda, Kawasaki; Hajime Kaneko, Kodaira; Masahiko Higuma, Tohgane; Yuji Kamiyama, Fujisawa; Yoichi Taneya, Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/184,645

(22) Filed: Nov. 3, 1998

Related U.S. Application Data

(62) Division of application No. 08/636,766, filed on Apr. 19, 1996, now Pat. No. 5,953,030.

(30) Foreign Application Priority Data

| | | |
|---|---|---|
| Apr. 24, 1995 | (JP) | 7-098524 |
| May 31, 1995 | (JP) | 7-133739 |
| Nov. 15, 1995 | (JP) | 7-297113 |

(51) Int. Cl.[7] .......... B41J 2/175; B65B 7/00; B32B 31/20; B32B 4/00

(52) U.S. Cl. .......... 347/86; 156/69; 156/308.4; 156/344

(58) Field of Search .......... 347/84, 85, 86, 347/87; 156/69, 308.4, 289, 309.6, 344

(56) References Cited

U.S. PATENT DOCUMENTS

| | | | |
|---|---|---|---|
| 4,878,069 | 10/1989 | Kiyohara | 346/140 |
| 5,262,802 | 11/1993 | Karita et al. | 347/87 |
| 5,448,274 | 9/1995 | Hirabayashi et al. | 347/86 |
| 5,481,289 | 1/1996 | Arashima et al. | 347/93 |
| 5,502,479 | 3/1996 | Ishinaga et al. | 347/93 |
| 5,509,140 | 4/1996 | Koitabashi et al. | 347/86 |
| 5,557,310 | 9/1996 | Kurata et al. | 347/87 |
| 5,600,358 * | 2/1997 | Baldwin et al. | 347/87 |
| 5,940,104 * | 8/1999 | Karita et al. | 347/87 |

FOREIGN PATENT DOCUMENTS

| | | |
|---|---|---|
| 418828 | 3/1991 | (EP) . |
| 514632 | 11/1992 | (EP) . |
| 546544 | 12/1992 | (EP) . |
| 529880 | 3/1993 | (EP) . |
| 580433 | 1/1994 | (EP) . |
| 581531 | 2/1994 | (EP) . |
| 589540 | 3/1994 | (EP) . |
| 623444 | 11/1994 | (EP) . |
| 627317 | 12/1994 | (EP) . |
| 631874 | 1/1995 | (EP) . |
| 631875 | 1/1995 | (EP) . |
| 638426 | 2/1995 | (EP) . |
| 685340 | 12/1995 | (EP) . |
| 2264997 | 9/1993 | (GB) . |
| 2269784 | 2/1994 | (GB) . |
| 04-144755 | 5/1992 | (JP) . |
| 05-162326 | 6/1993 | (JP) . |

* cited by examiner

*Primary Examiner*—Judy Nguyen
(74) *Attorney, Agent, or Firm*—Fitzpatrick, Cella, Harper & Scinto

(57) ABSTRACT

A manufacturing method for an ink container mountable to an ink jet apparatus in which the ink container includes an ink supply port, an air vent which has an inside opening which opens to an inside of the ink container, a groove functioning as an outside opening and extended from the inside opening, and a wall except in a region functioning as an outside opening around the groove. According to the method, a seal member is positioned to a position corresponding to the ink supply port and the air vent, and the wall is thereafter collapsed through the seal member by a welding horn. By virtue of this method, a cover is thus provided in the wall above the groove to form a fluid communication path for fluid communication between the inside opening and the outside opening, with simultaneous welding of the seal member by heat.

2 Claims, 18 Drawing Sheets

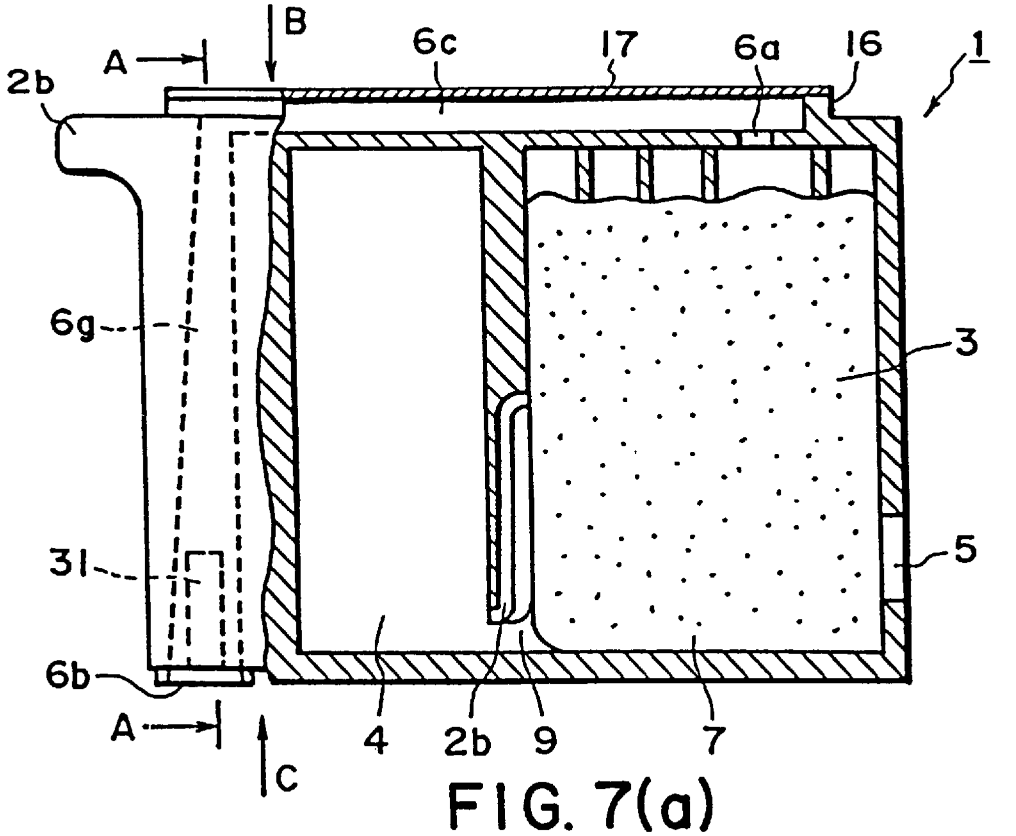
FIG. 7(a)
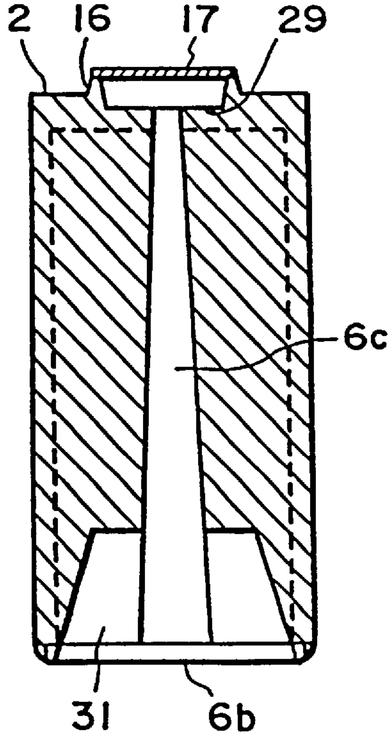
FIG. 7(b)
FIG. 7(c)
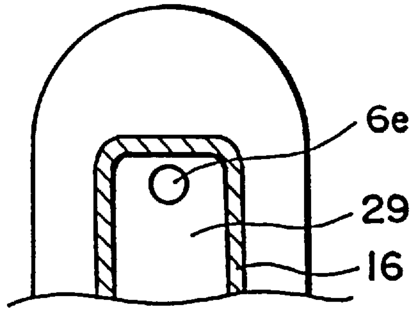
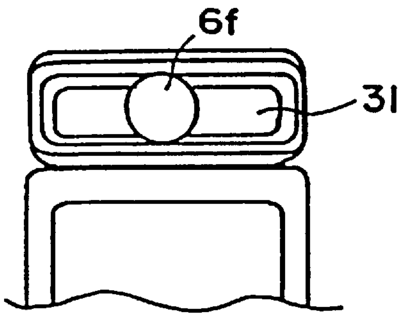
FIG. 7(d)

METHOD OF MANUFACTURING AN INK CONTAINER

This application is a division of application Ser. No. 08/636,766 filed Apr. 19, 1996, now U.S. Pat. No. 5,953, 030.

FIELD OF THE INVENTION AND RELATED ART

The present invention relates to an ink container for retaining ink to be supplied to a recording head, and a manufacturing method of the ink container, wherein an air venting structure is improved.

In the field of the ink jet recording, a cartridge having an integral recording head portion and ink container containing the ink to be supplied thereto, and a cartridge having separable recording head and ink container, are known. In the ink container for the cartridge, the use is made with ink retentivity of an ink absorbing material accommodated in the entire space therein, and is balanced with the meniscus ejection outlet of the recording head to accomplish balanced ink supply.

In such an ink container generally, the ambience gasses (air) are introduced into the ink container, corresponding to the ink being supply out. That is, the region having the ink is replace with the air. Smooth introduction of the air is one of important factors to stabilize the ink to the recording head. Therefore, the air vent for introducing the air is one of important constituent-elements, for the ink container. The above-described air vent constitutes the communication state with the ambience by opening the inside of the ink container to the outside (ambience). However, the provision of the air vent results in the problems that components of the ink accommodated therein are evaporated or that the ink leaks out of the container through the air vent upon unexpected shock or abrupt ambient condition change.

As a countermeasure, Japanese Laid Open Patent Application No. HEI-4-144755 propose that a distance of a fluid communication path for communicating an inside opening of the ink container and an outside opening, is increased, or that the fluid communication path is bent in a complicated manner, or that the communication passage is divided into a plurality of chambers.

With such a structure, the outside opening of the air vent line of the ink container is directed upwardly in use to avoid the leakage, or the outside opening is disposed at a level above the inside opening, or they are at least same level, in many cases.

In one type of ink containers, it is detachably mountably connected relative to the recording head, and they are integrally mounted so that they scan the recording medium in the recording region in a main-scanning direction. During the main-scanning motion of the carriage, the foreign matter or paper dust are scattered. If this occurs, the paper dust or the like may enter the air vent of the ink container carried on the carriage, or in the case of long term non-use period, the dust may be deposited.

In such a case, the satisfactory introduction of-the air into the ink container is no longer expected, with the result that the ink supply performance is affected.

In order to increase the amount of the ink which the ink container can retain, an ink container has been proposed wherein the inside space is divided into two parts, one of which is provided with an ink supply port for supplying the ink out and contains an ink absorbing material, and the other of which contains substantially only the ink. The ink is replenished into the ink absorbing material chamber from the ink accommodating chamber through a communication port at the bottom. In the ink container, in order to prevent the leakage through the air vent, the air vent 6 is provided at a position as remotest as possible position from the ink supply portion. In FIG. 1 example, the air vent is provided above the ink supply port, and inside opening and the outside opening of the air vent take substantially the same level when it is mounted to the apparatus.

In this structure, the air enters the ink accommodating chamber side with consumption of the ink with the recording operation. The results in the formation of the ink layer and the air layer in the ink accommodating chamber. When the change, of the ambience, for example a rise of the temperature, occurs, the air layer is expanded to push the ink into the absorbing material accommodating chamber, and the air is released through the air vent. When the temperature lowers, the air is taken into the absorbing material accommodating chamber through the air vent. Under the circumstances having paper dust, the paper dust is relatively easily taken in by the air vent when the air is introduced. If the paper dust is accumulated into the fluid communication path, the ambience communication is not properly effected, with the result that the ink supply property may be deteriorated.

On the other hand, the fluid communication path of the air vent, is preferably longer from the standpoint of suppression effect against the evaporation of the ink. However, if the ink is introduced into the air vent path or line, the ink in the long line stays unless the ink moves to the outside opening of the air venting line. Then, the viscosity increase and fixing of the ink may occur in the fluid communication path with the result of plugging the fluid communication path, and therefore, the deterioration of the ink supply property.

Recently, the downsizing of the ink jet apparatus is enhanced, and in addition, a color printing ink jet apparatus is demanded. For such an ink container, the long air vent path is desired, too, but the use of such a complicated structure is not always easy.

From the standpoint of desirability of recycling, the injection of ink into an used ink container is desired. After the refill of the ink, the proper link supply operation is to be performed.

Accordingly, it is a principal object of the present invention to provide an ink container and a manufacturing method of the ink container, wherein the structure of the air vent line influential to the supply performance of the ink is improved to permit stable introduction of the air.

According to an aspect of the present invention, there is provided an ink container comprising: an ink absorbing material accommodating chamber for accommodating an ink absorbing material for retaining ink to be supplied to a recording head; an ink supply opening connectable with the recording head to supply the ink to the recording head from the accommodating chamber; an air vent portion for fluid communication between the accommodating chamber with ambience; wherein the air vent portion has an inside opening in fluid communication with an inside of the accommodating chamber, an outside opening open to the ambience, and a fluid communication path in fluid communication with the inside opening and outside opening; wherein the outside opening takes, when the container is mounted on an apparatus with which it is usable, a position lower than that taken by the inside opening.

It has been found preferable that a trapping portion is provided in an air venting line.

According to another aspect of the present invention, there is provided an ink container for containing ink to be supplied to an ink jet head exchangeably mounted to an ink jet apparatus, comprising: a body for containing the ink; a partition wall for dividing an inside of the ink container into first and second chambers; wherein the first chamber has an ink supplying portion and an air vent portion and contains an ink absorbing material; wherein the second chamber contains the ink; a communicating portion, formed between the partition wall and a bottom surface of the container, for fluid communication between the first and second chambers; wherein the air vent portion comprises an inside opening which opens to an inside of the ink container, an outside opening which opens to ambience, a fluid communication path for fluid communication between the inside opening and the outside opening, and a cover for constituting the fluid communication path, wherein the outside opening takes, when the container is mounted to the apparatus, a position lower than that of the inside opening.

It is preferable that the air vent portion is disposed on a side of the container which has the ink supply opening.

It is preferable that the inside opening of the air vent portion is disposed on a side of the container different from a side having the ink supply opening, the outside opening is disposed on a side of the container different from a side having the ink supply opening and different from a side having the inside opening.

It is preferable that the outside opening of the air vent portion takes, when the container is mounted to the apparatus, a position lower than that of electrical contact portion for electric connection with the recording head.

It is preferable that the outside opening of the air vent portion opens downwardly.

It is preferable that the fluid communication path has a cross-sectional area which gradually increases toward the outside opening adjacent to the outside opening.

The present invention is suitably applicable to an ink container which is divided into two spaces which communicate through a communicating opening, and one of which is provided with the ink supply opening and contains a ink absorption member.

It is preferable that the air vent path has a region where the flow path resistance changes.

It is preferable that the outside opening is provided by a recess extending in a width direction of the ink container, and the portion is in fluid communication with the recess.

It is preferable that the outside opening takes a position above a bottom surface of the ink container.

It is preferable that there is provided an ink accommodating portion for accommodating ink, which is in fluid communication with the ink absorbing material accommodating portion through a communication port.

With such structures, the paper dust or foreign matter are not easily introduced through the air vent, so that the clogging of the air vent is easily prevented.

According to a further aspect of the present invention, there is provided a manufacturing method for an ink container mountable to an ink jet apparatus, comprising the steps of: providing a main body of an ink container having an ink supply port and an air vent, wherein the air vent has an inside opening which opens to an inside of the ink container, a groove, functioning as an outside opening, extended from the inside opening, and a wall provided except for a region functioning as the outside opening around the grove; providing a seal member for sealing the ink supply port and the air vent; positioning the seal member corresponding to the ink supply port and air vent of the main body; collapsing the wall through the seal member by welding horn; thus providing a cover by the wall above the groove to form a fluid communication path for fluid communication between the inside opening and said outside opening and simultaneously to weld the seal member by heat.

According to a further aspect of the present invention, there is provided a sealing method for an ink container having a front side, a rear side, a bottom side, an upper side and two lateral sides, and having an ink supply port for supplying ink to a recording head portion and an air vent for fluid communication between an inside of of the ink container and ambience, comprising: mounting a seal member on a first one of the sides and on a second one of the sides continuous with the first side, the seal member having a width larger than a width of the first and second sides; inwardly folding the seal member beyond the width of the first side; outwardly folding the seal member beyond the width of the second side; mounting by heat sealing the inwardly folded seal member to a side of a packaging bladder for accommodating the ink container.

According to a further aspect of the present invention, there is provided a ink cartridge comprising: a main body for containing ink and provided with an ink supply port and an air vent; a seal member removably mounted on a surface of the ink cartridge, the seal member having a first sealing portion for sealing the ink supply port and a second sealing portion for sealing the air vent; wherein the seal member has an operating portion to receive separation force for removing the seal member, the seal member has a plurality of mounted portions on sides of a main body of the ink cartridge, and wherein the first sealing portion is disposed closer to a mounted portion which forms a smaller angle relative to a direction of separation than the second sealing portion.

With this method, a covering is provided by the wall to permit simultaneous formation of the fluid communication path between the inside opening and the outside wall and the welding of the seal member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 7 is a sectional view of an ink container according to a further embodiment of the present invention, wherein (*a*) is a sectional view thereof, (*b*) is a back side view thereof, and (*c*) and (*d*) are partial enlarged view.

DESCRIPTION OF THE PREFERRED EMBODIMENTS

Referring to the accompanying drawings, the embodiments of the present invention will be described.

(Embodiment 1)

Figure 1:
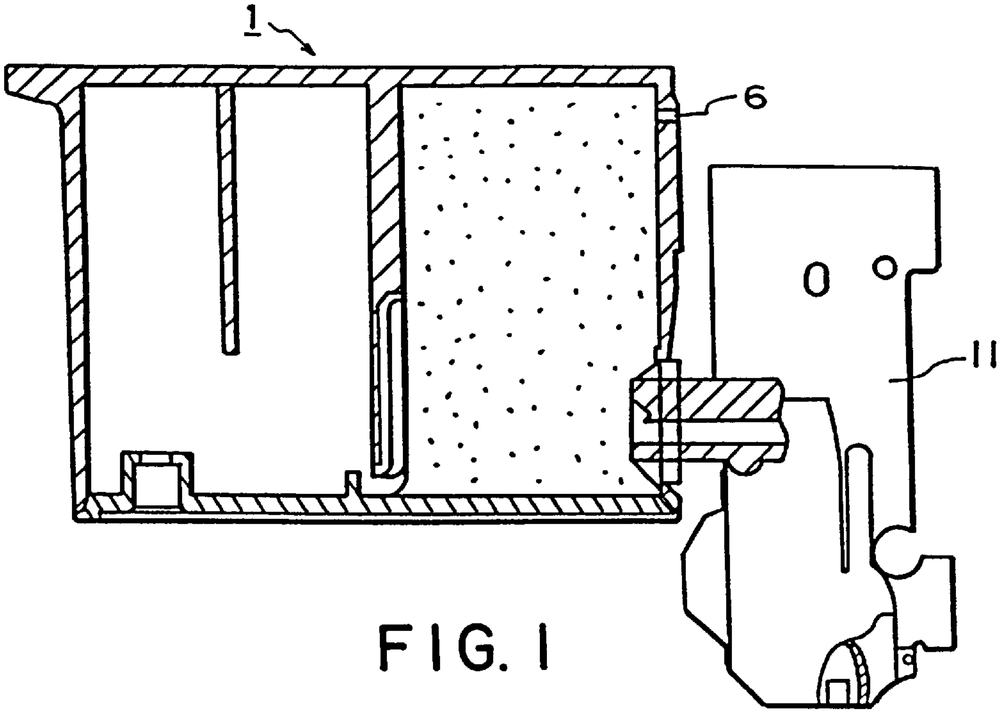
FIG. 1 is sectional view of an ink container not using the present invention.
Figure 2A:
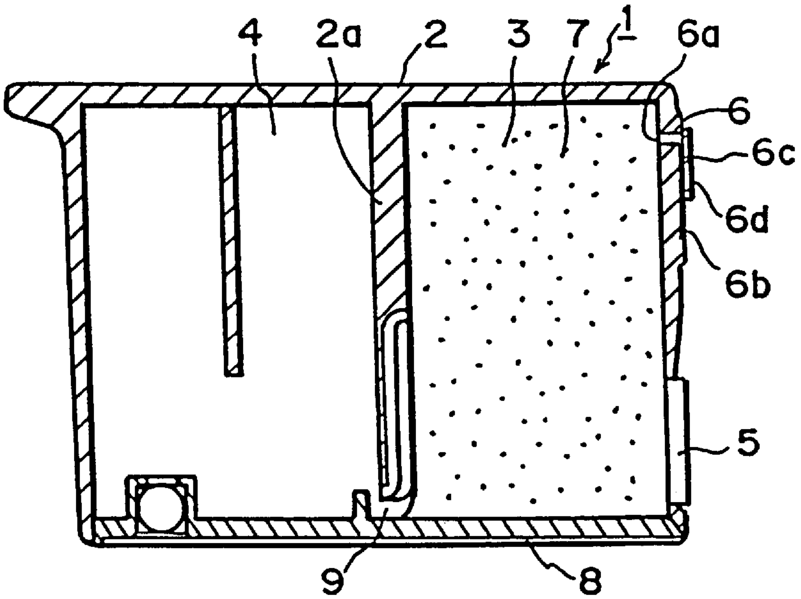
FIG. 2, (*a*) is a sectional view of an ink container according to an embodiment of the present invention, (*b*) is a front view thereof, and (*c*) is a bottom view thereof.
Figure 2B:
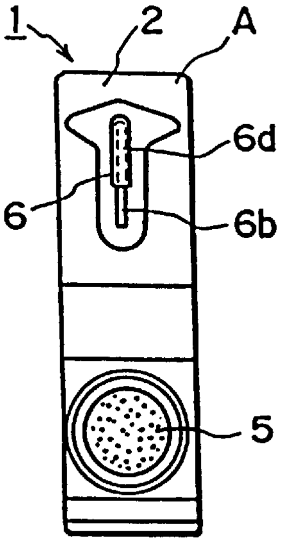
Figure 2C:
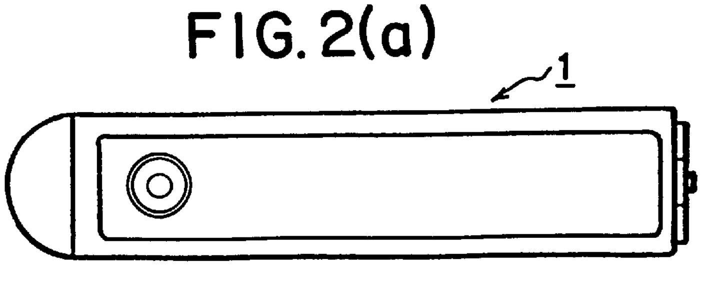

FIG. 2 is a sectional view of an ink container 1 according to an embodiment of the present invention. A casing 2 constituting the ink container 1 is substantially rectangular parallelopiped configuration, and is provided with, at a side, an ink supply port 5 to which an ink supply tube of an unshown recording head is inserted. The side provided with the ink supply port 5 is further provided with an air vent 6 for communication between the ambience and the inside of the ink container 1.

The inside of the casing 2 of the ink container 1 is divided by a partition 2*a* into two parts, and one of spaces 3 communicating with the ink supply (port 5 contains an ink absorbing material 7 (ink absorbing material chamber), and the other space 4 contains the ink (ink chamber). Between the bottom surface 8 and the partition 2*a*, a small gap is provided, through which the ink is supplied from the ink chamber 4 side to the ink absorbing material chamber 3 side. With the ink being supplied out, the negative pressure of the ink chamber 4 side increases. Upon a predetermined pressure reached, the air introduced through the gap cancels the increase of the negative pressure of the ink chamber 4, and the ink flows from the ink absorbing material chamber 3 into the ink chamber 4. This is repeated, and the ink is consumed from the ink container.

As shown in FIG. 2, the air vent 6 path or line provided in the casing 2, comprises an inside opening end 6*a* opening in the inside having the ink supply port 5, an outside opening end 6*b* opening the outside thereof, a fluid communication path 6*c* connecting these opening ends, and a cover covering a part of the fluid communication path 6*c* to provide a passage.

The ink container 1 of this embodiment is mounted to a device with its bottom surface at the bottom, as shown in FIG. 2.

By the cover 6*d*, the air vent 6 line of this embodiment is such that the outside opening end 6*b* is disposed at a lower position than the inside opening end 6*a*. With this structure, the introduction of the foreign matter or paper dust to the inside opening end 6*a* through the fluid communication path 6*c* from the outside opening end 6*b* of the air vent 6, is effectively prevented. As shown in FIG. 2, the outside opening end 6*b* has a downwardly inclined surface to that stagnation of the foreign matter or paper dust is prevented.

Figure 3:
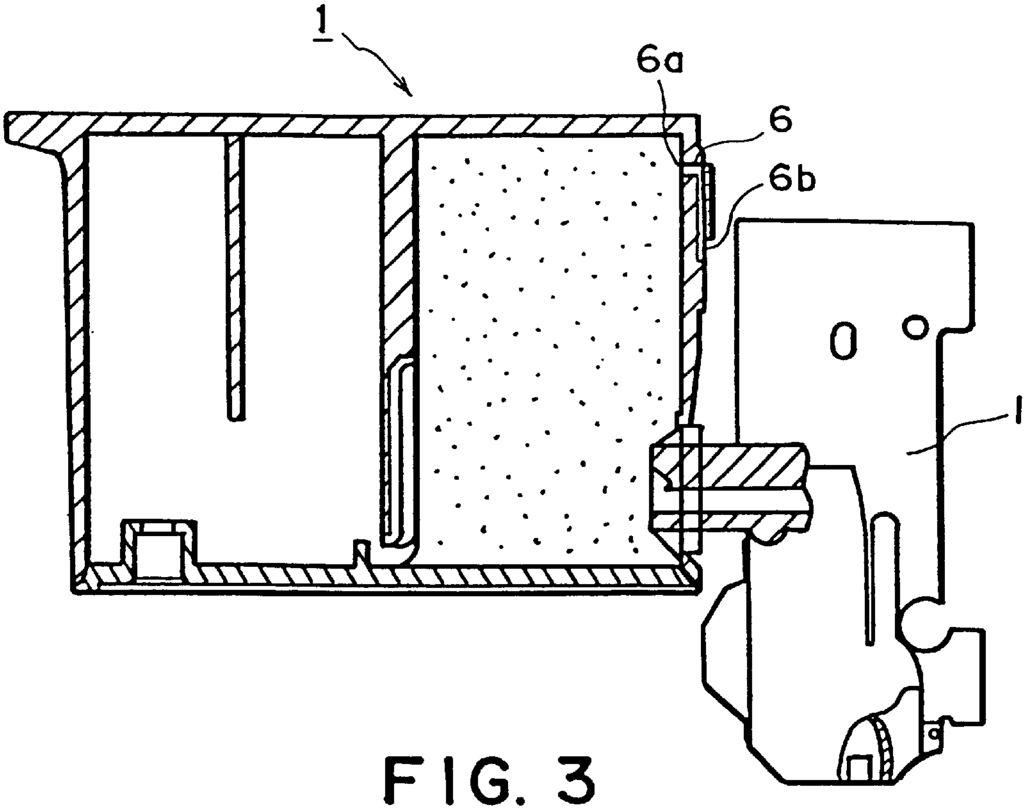
FIG. 3 is a sectional view of an ink container mounted to a recording head.

FIG. 3 shows the ink container 1 mounted on a recording head 11. As shown in FIG. 3, the outside opening end 6*b* of the air vent 6 is positioned so that it is covered by a surface faced to a part of elements of the recording head 11, and therefore, the part of the elements of the recording head 11 functions to cover the outside opening end 6*b* of the air vent 6. Therefore, the entering of the dust or paper dust are further prevented, as compared with the conventional structure.

(Embodiment 2)

Figure 4:
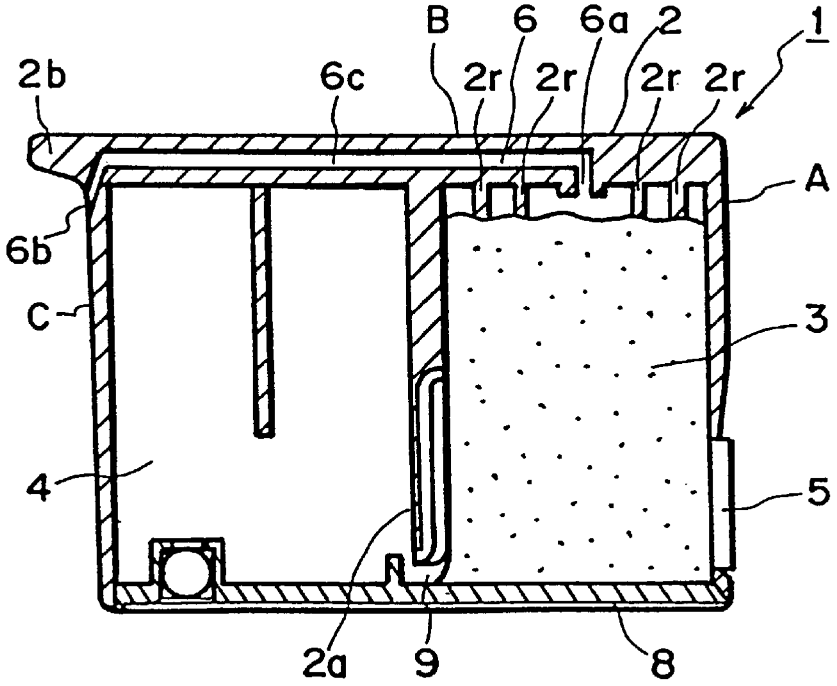
FIG. 4 is a sectional view of an ink container according to another embodiment of the present invention.

FIG. 4 shows an ink container 1 of another embodiment of the present invention. In this example, the inside opening end 6*a* of the air vent 6 is positioned in a part of of the top side of the ink container 1, and a plurality of ribs 2*r* are provided around the inside opening end 6*a*.

On the other hand, the outside opening end 6*b* opens at a side c which is opposed to the side having the ink supply port 5 of the ink container, wherein the inside opening end 6*a* and the outside opening end 6*b* are in fluid communication with each other through the fluid communication path 6*c* provided at the upper side.

By the provision of the outside opening end 6*b* of the air vent in a side opposite from the connecting portion relative to the recording head, floating matter such as the paper dust or another dust do not easily go around. Right above the outside opening end 6*b* of the air vent 6, there is provided a grip or knob portion 2*b* for facilitating the mounting and demounting relative to the carriage, so that the grip portion 2*b* functions as a visor to prevent the dust or the like from coming from the top. Since the fluid communication path 6*c* is longer than in the previous example, the evaporation is effectively prevented.

Figure 5:
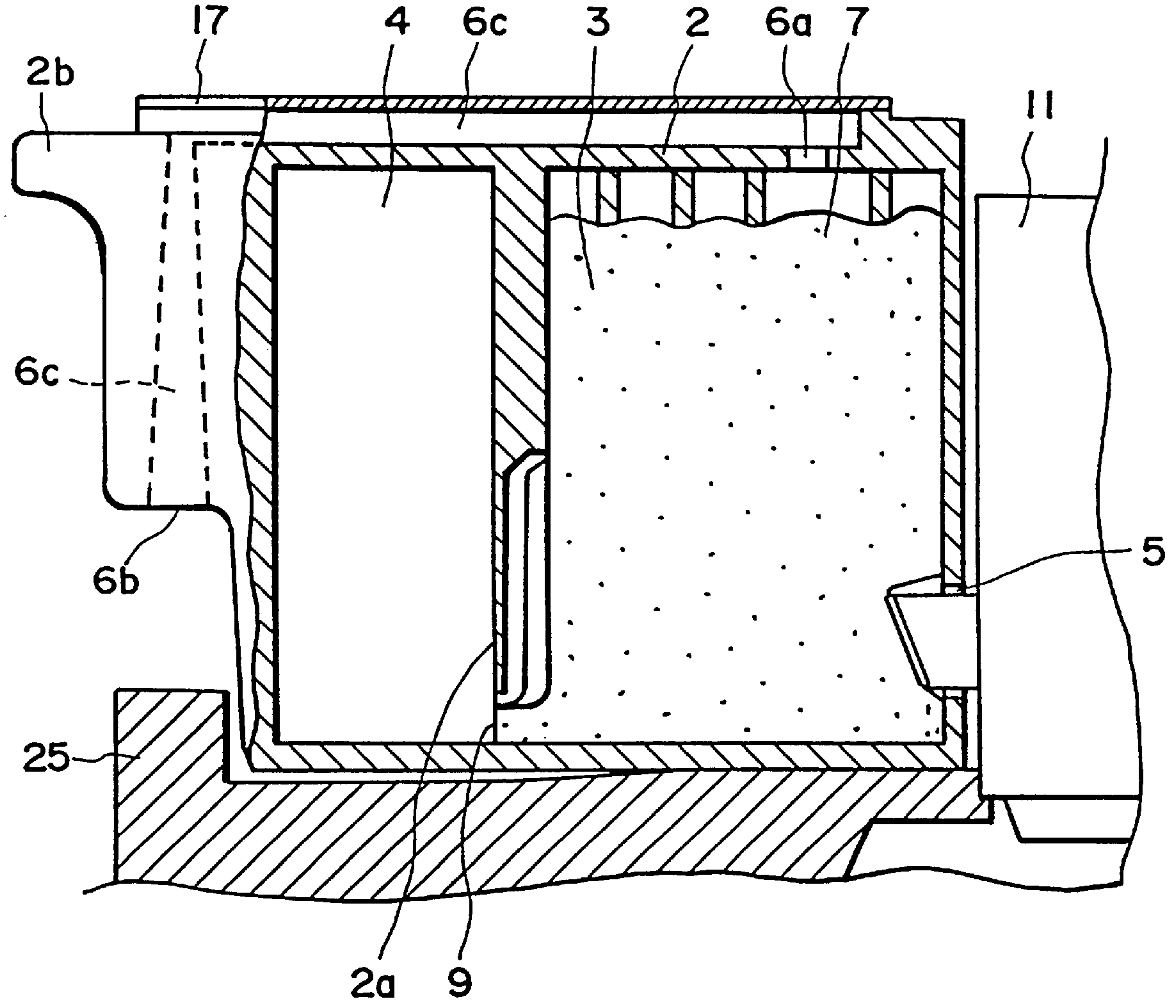
FIG. 5 is a sectional view of an ink container according to a further embodiment of the present invention.

As shown in FIG. 5, the outside opening 6*b* may be provided away from a ink cartridge contact surf ace of the carriage 25 on which the ink cartridge is mounted, more particularly, it may be provided above the bottom surface of the ink cartridge. In this case, the air vent path is disposed in a side, using a space of the grip portion provided behind the ink cartridge (at an opposite side from the ink supply port in FIG. 2). By this, the length of the air vent path is assured, while effectively using the space occupied by the ink cartridge in the ink jet recording, apparatus. Since the grip portion 2*b* is not positioned directly at the outside, the operator is prevented from plugging the air vent by his finger, thus improving the operativity.

(Embodiment 3)

Figure 6:
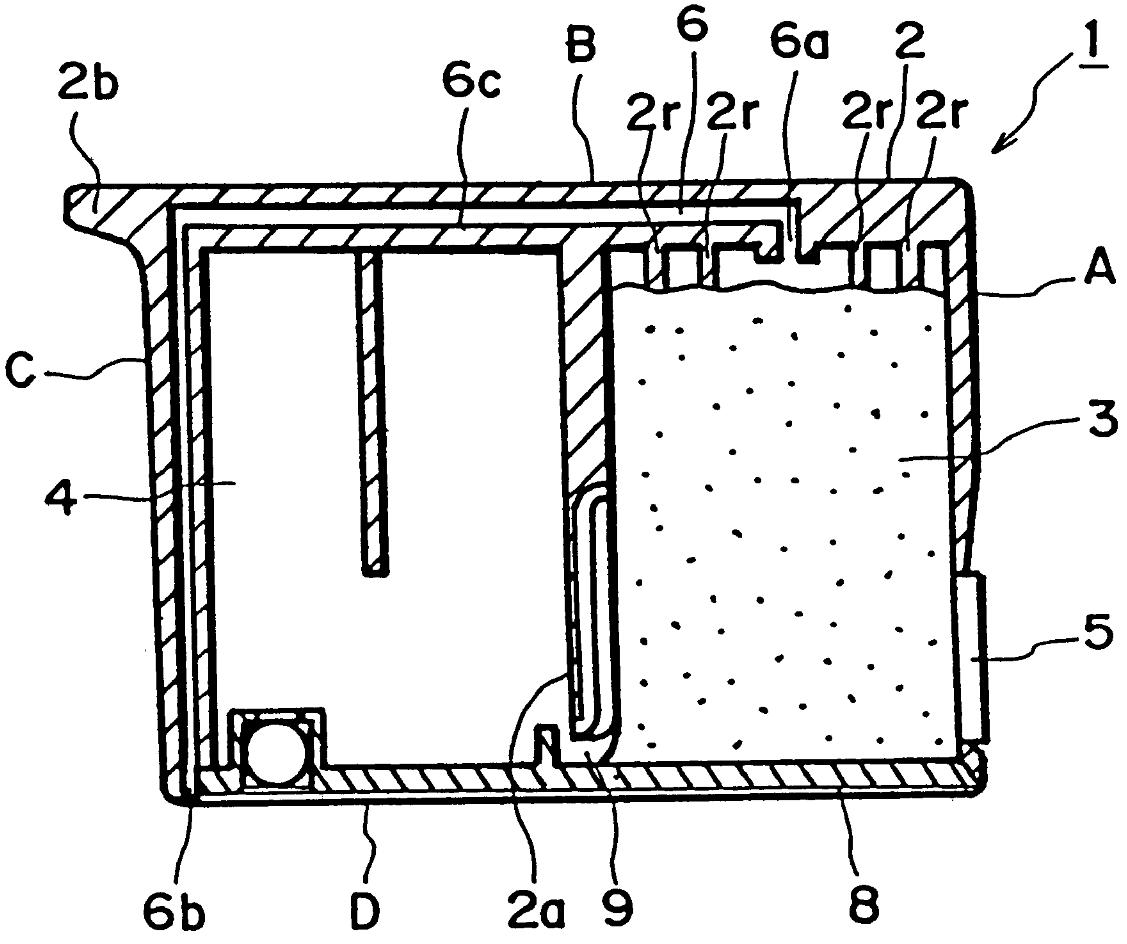
FIG. 6 is a sectional view of an ink container according to a further embodiment of the present invention.

With the structure of Embodiment 2, the outside opening end 6*b* of the air vent 6 is provided right below the grip portion 2*b* of the ink container, and therefore, there is a liability that the finger contacts the air vent during the exchanging operation of the ink container 1. In this case, the air existing in the space of the air vent 6 is likely to be warmed by the finger with the result of increase of the pressure of the ink absorbing material chamber 3 of the ink container 1. Then, the ink leakage may occur through the ink supply port. In view of this, the fluid communication path 6*c* may be further extended (the diameter of the extended fluid communication path 6*c* is the same), as shown in FIG. 6 to dispose the outside open end 6*b* in the bottom surface D of the ink container.

In this case, the bottom surface D is disposed so as to face the carriage when the ink container 1 is mounted to the device. Therefore, the outside opening end 6*b* of the air vent 6 is open, facing to the carriage. Thus, the going-around of the paper dust can be properly prevented, and since the opening end 6*b* faced downward, the dust or the like does not enter so that the plugging of the air vent with the paper dust or dust can be avoided.

(Embodiment 4)

FIG. 7 shows an ambience communication structure of the ink cartridge according to Embodiment 4.

Here, FIG. 7, (*a*) is a sectional view of the ink cartridge, and FIG. 7, (*b*) is a section taken along a line A—A in FIG. 7, (*a*). FIG. 7, (*c*) is a partially enlarged view as seen from the top of FIG. 7, (*a*) (arrow B direction) without a seal 7, and FIG. 7, (*d*) is a partially enlarged view as seen from the bottom (arrow C direction) in FIG. 7, (*a*).

In FIG. 7, designated by 4 is an ink retaining portion for retaining the ink, and 3 is a negative pressure generation portion for pressure adjustment, provided in order to prevent the ink leakage from the recording head portion. Here, the negative pressure is a back pressure relative to to the ink flow supplied to the recording head, and it keeps the pressure in the recording head below the ambient pressure.

In this embodiment, a porous material 7 is provided, and the capillary force thereof when it retains the ink is used to produce the negative pressure. The negative pressure producing member is not limited to the porous, but may be a material having gaps capable of producing capillary force (fiber or the like).

The ink accommodating portion is formed by the negative pressure generation portion 3 and the above-described ink retaining portion 4. Designated by 5 is an ink supply port for discharging the ink to the recording head (outside) from the ink accommodating portion.

An air vent portion for introducing the atmospheric air into the ink accommodating portion with this ink supply, comprises an inside opening 6a communicating with the negative pressure generation portion 3 in the ink accommodating portion, an outside opening 6*b,* opening to the outside ambience, and an air vent path 6*c* establishing fluid communication between the inside opening 6*a* and the outside opening 6*b.*

The air vent path has an upper region provided by covering the groove 29 provided in an upper side wall of the ink cartridge 1 with the seal 17 as a sealing wall member, and a side region in a side wall extending in a direction of the gravity when the ink cartridge 1 is mounted on an ink jet recording apparatus. Here, sealing of the above-described top side portion is effected by providing a projection 16 around the groove 29 and welding the seal member onto the projection.

By this, the space can be effectively used to provide a long air vent path even in a flat small cartridge. By this air vent portion, the ambient air introduced into the negative pressure generation portion 3, is introduced into the ink retaining portion 4 through the ambience introduction groove 6*c* in accordance with the ink consumption.

In this embodiment, there is provided a cross-sectional area changing portion 6*g* having a gradually increasing cross-sectional area toward the opening 6*b* over the entirety side area adjacent to the outside opening in the air vent portion, as shown in the lower end portion opening 6*f* in the side region in FIG. 7, (*d*) and in the upper end portion opening 6*e* in the side wall shown in FIG. 7, (*c*).

In the cross-sectional area changing portion 6*g,* a gradient of the capillary force is provided by the change of the cross-sectional area by forming inclination on the wall forming the air vent path, and therefore, the ink tends to be urged upwardly even if the ink enters the air vent portion and reaches the neighborhood of the outside opening 6*b* upon ambient condition change or the like.

Therefore, by the provision of the air vent path over the wall in the top and side region, the length of the air vent path can be increased while using the space effectively. Additionally, the remaining ink in air vent portion in the side region where the ink easily move, is urged in a direction opposite from the ink leaking direction, and therefore, the ink leakage can be effectively avoided.

In this embodiment, a recess 31 having a width smaller than the width of the cross-sectional area change portion 6*g* (maximum widths measured in a direction perpendicular to the extending direction of the air vent path), is provided adjacent the outside opening 6*b,* along a side wall of the ink cartridge (in a direction of thickness of a flat ink cartridge). By doing so, eve if the ink stagnates adjacent the external opening, the ink can be distributed over a wide area, thus promoting evaporation of the stagnating ink.

(Embodiment 5)

Figure 8A:
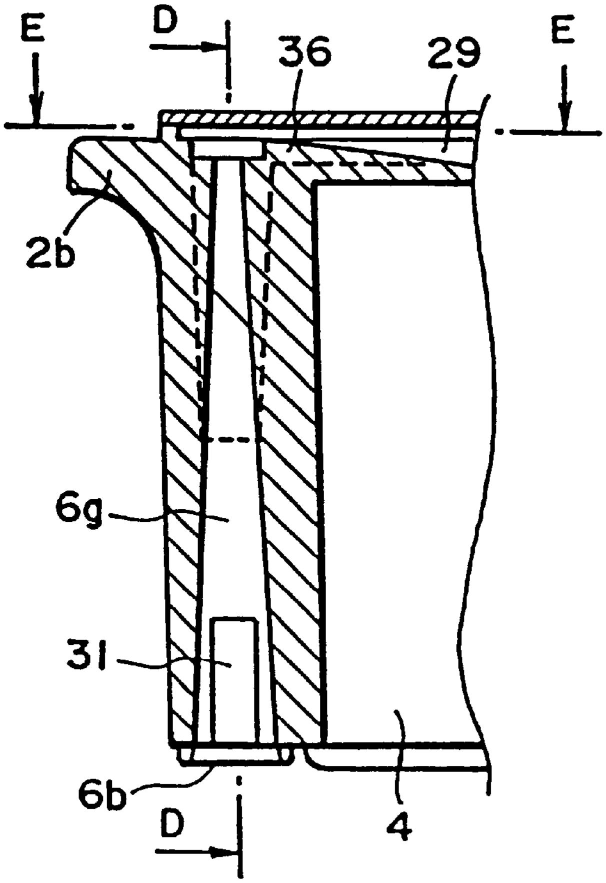
FIG. 8 is an illustration of an ink container according to a further embodiment of the present invention, wherein (*a*), (*b*) and (*c*) are partially enlarged sectional views of the ink container.
Figure 8B:
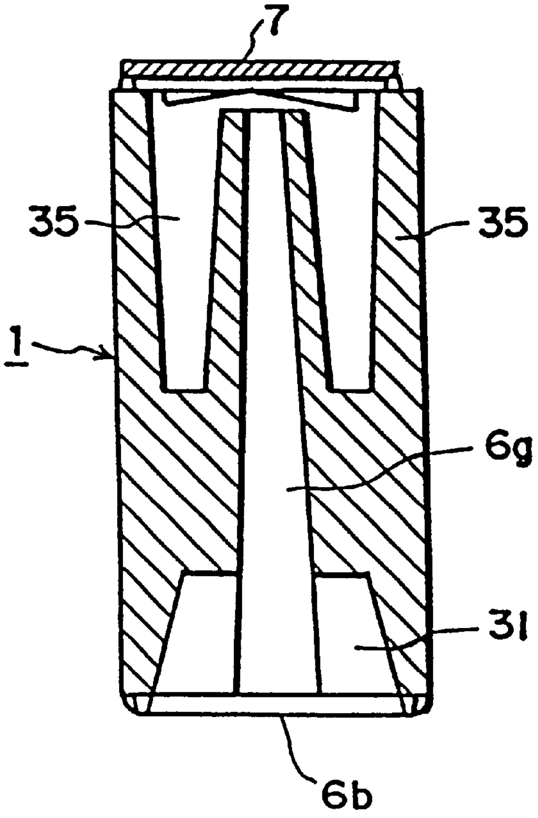
Figure 8C:
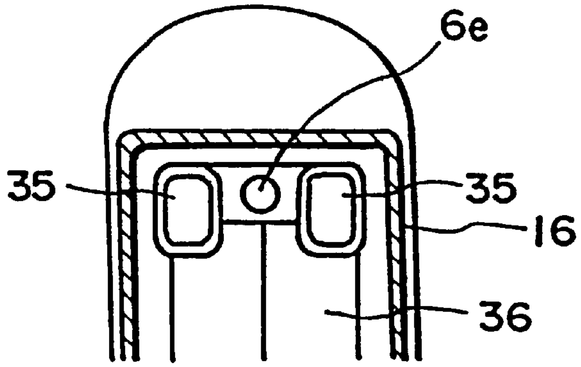

FIG. 8 shows an ambience communication structure of the ink cartridge according to Embodiment 5.

FIG. 8, (*a*) is an enlarged sectional view of a portion having a side region of an air vent portion of the ink cartridge, and FIG. 8, (*b*) is a section taken along a line D—D in FIG. 8, (*a*), and FIG. 8, (*c*) is a section taken along an E—E in. FIG. 8, (*a*). In this embodiment, there is provided a ink collection portion 35 for temporarily retaining the ink having entered the air vent portion due to inside pressure change or the like. The ink collection portion 35 is disposed adjacent the air vent path in the ink cartridge side wall having the air vent path in the side region.

Additionally, there is provided an inclined portion 36 adjacent the upper portion opening 6*e* of the air vent path in the upper side region so as to avoid reaching of the ink having entered the upper portion opening 6*e* of the air vent path in the side region.

By this, even if the ink enters the air vent portion, it can be prevented from leaking to the outside, without expanding the space occupied by the ink cartridge. Further, this prevention effect is provided irrespective whether the ink in the container is a replenished ink or not.

The inside of the air vent path 6*c* can be made wet by trapping the ink in the ink collection portion 35, so that the ink in the ink container is effectively prevented.

(Embodiment 6)

Figure 9A:
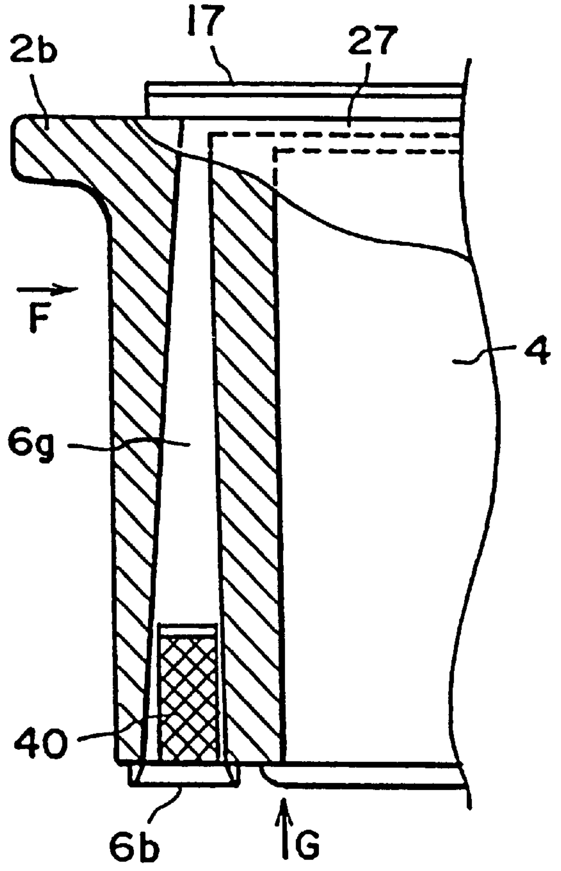
FIGS. 9 (*a*)–(*c*) are partially enlarged sectional views of an ink container according to a further embodiment of the present invention.
Figure 9B:
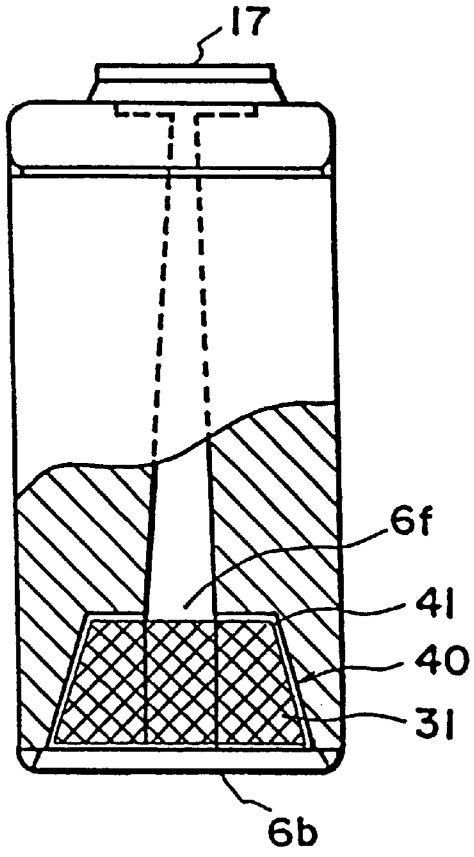
Figure 9C:
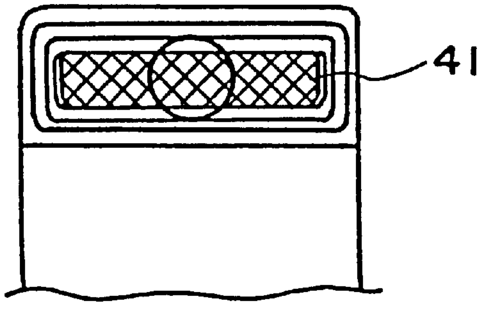

FIG. 9 shows an ambience communication structure of an ink cartridge according to Embodiment 6. FIG. 9, (*a*) is a partially enlarged sectional view of an air vent path in a side region; FIG. 9, (*b*) is a partially enlarged sectional view as seen from the back side (arrow F direction) in FIG. 9, (*a*); and FIG. 9, (*c*) is a partially enlarged sectional view as seen from the bottom (arrow G direction) in FIG. 9, (*a*).

In this embodiment, there is provided an ink absorbing material 40 comprising porous material in the recess 31 provided adjacent the outside opening 6*b*.

The ink absorbing material 40 is provided at a position facing to the end portion opening 6*f* of the air vent path of the side region in the recess 31, and it has size providing a gap 41 for ambience introduction to between the wall forming the recess.

By doing so, even if the ink reaches the outside opening 6*b*, it is collected by the ink absorbing material 40 so that the ink leakage can be prevented. At this time, the gap provides a circumventing air vent path adjacent the outside opening 6*b*, and therefore, the flow of the air is permitted, and the ink evaporation from the ink absorbing material portion 40 can be promoted assuredly.

(Embodiment 7)

Figure 10A:
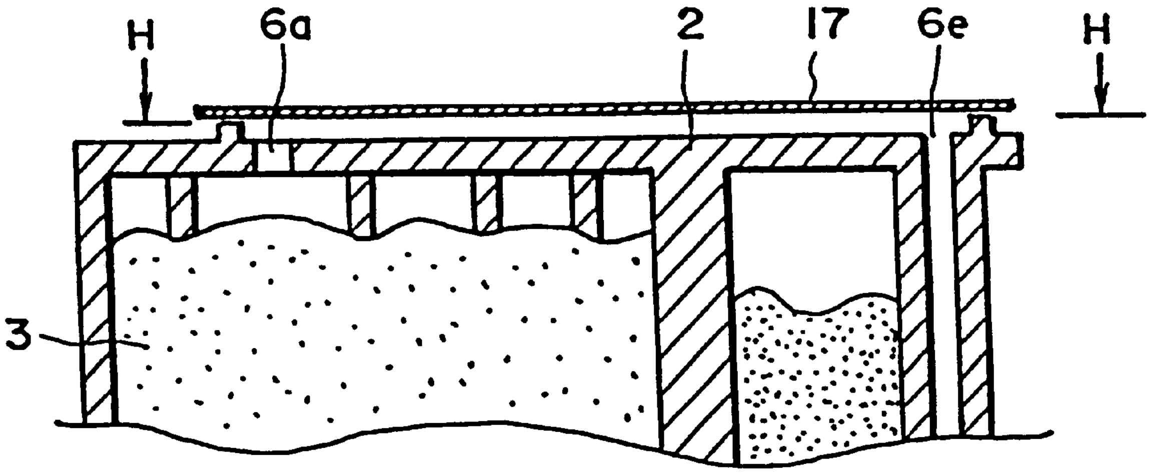
FIGS. 10 (*a*) & (*b*) are enlarged sectional view of the major portion of an ink container according to an embodiment of the present invention.
Figure 10B:
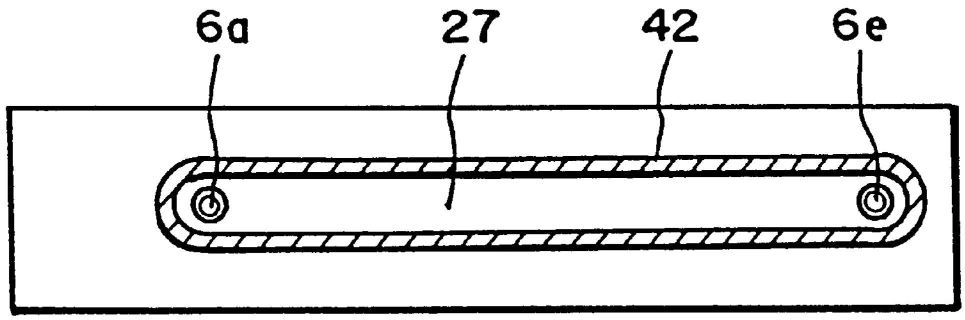

FIG. 10 shows a top side region structure of the ambience communication structure according to Embodiment 7.

Here, FIG. 10, (*a*) is a partial sectional view of the air vent portion in the top side region, and FIG. 10, (*b*) is a section taken along a line H—H in FIG. 10, (*a*).

In the above-described embodiments, the wall constituting the upper surface of the ink cartridge is provided with the groove 29, but in this embodiment, the groove is not provided, and a rib (projection) 42 is provided, and is covered by a seal portion 7 so that the top side region of the air vent path 27 is provided.

In this case, by decreasing the height of the air vent path, the ink droplet having entered the air vent path is more easily contacted to the wall constituting the air vent path in the top side region, so that the flow path resistance against the movement of the ink in the top side region is increased.

(Embodiment 8)

Figure 11A:
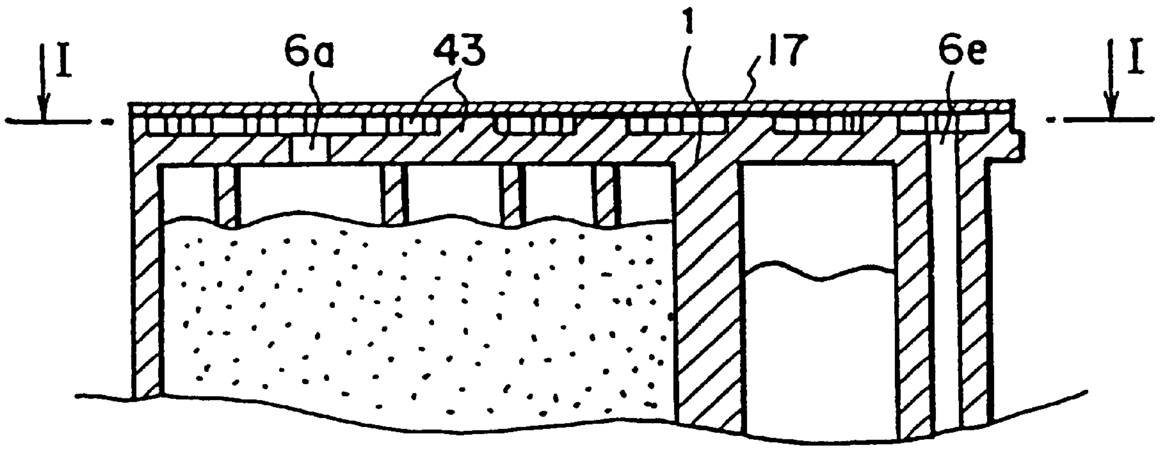
FIGS. 11 (*a*) & (*b*) are sectional views of a major part of an ink container according to an embodiment of the present invention.
Figure 11B:
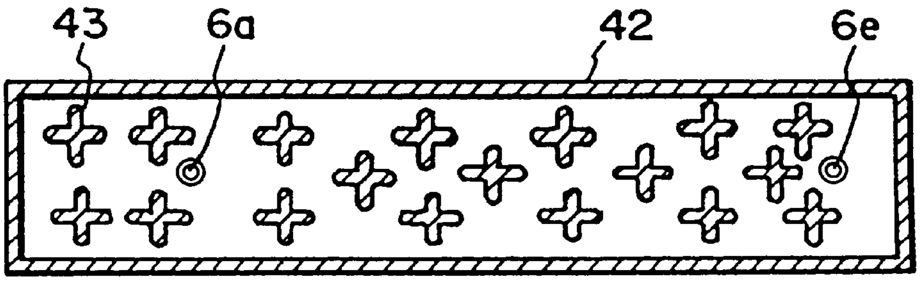

FIG. 11 shows an ink container according to Embodiment 8, wherein the ambience communication structure is modified from Embodiment 7.

Here, FIG. 11, (*a*) is a partial schematic sectional view of the air vent portion, and FIG. 11, (*b*) is a section view taken along a line I—I in FIG. 11, (*a*).

In this embodiment, the flow path resistance from the inside opening 6*a* to the end portion opening 6*e* of the air vent path in the side region is changed, that is, the capillary force is used to collect the ink locally introduced. In this case, the ambience moves between the projections.

In FIG. 11, there is provided a cross-shaped projection 43 as a means for collecting the ink. Therefore, adjacent to the projection 43, the capillary force is produced, so that the flow path resistance changes in the top side region.

Figure 12:
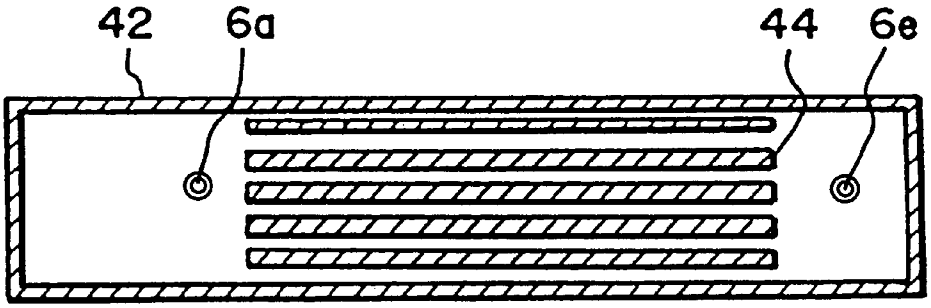
FIG. 12 is a sectional view of a major part of an ink container according to a further embodiment of the present invention.

FIG. 12 shows another example, wherein plate-like projections 44 are provided with different clearances in place of the above-described cross-shaped projection 43, thus providing paths having different flow path resistances to accomplish both of the ink collection and the ambience communication.

In FIG. 12, the projections is extended to the neighborhood of the end opening 6*e* in the side surface portion air vent path and to the inside opening 6*a*, so that the ink in the air vent portion is easily introduced into the ink accommodating portion.

Figure 13A:
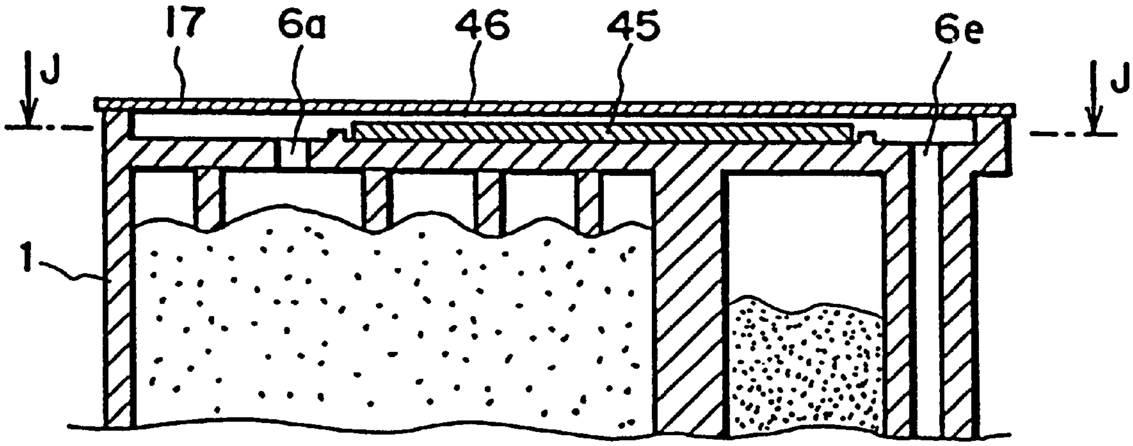
FIGS. 13 (*a*) & (*b*) are sectional views of a major part of an ink container according to a further embodiment of the present invention.
Figure 13B:
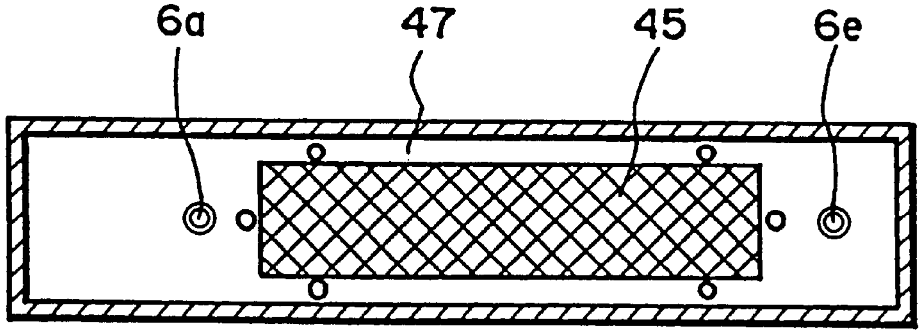

Further, FIG. 13 shows a modified example of the top side region of the ambience communication structure.

FIG. 13, (*a*) is a partial schematic sectional view substantially of the air vent portion, and FIG. 13, (*b*) is a section view taken along a line J—J of FIG. 13, (*a*).

In this embodiment, there is provided an ink absorbing material 45 comprising a porous material or the like in the top side region of the air vent portion to trap the ink, thus preventing movement of the ink introduced to the air vent path to the outside opening (unshown). Here, the ink absorbing material is disposed with a gap from the wall forming the air vent path in the top side region to form portions 46 and 47 having low flow path resistances for ambience introduction.

(Embodiment 9)

Figure 14A:
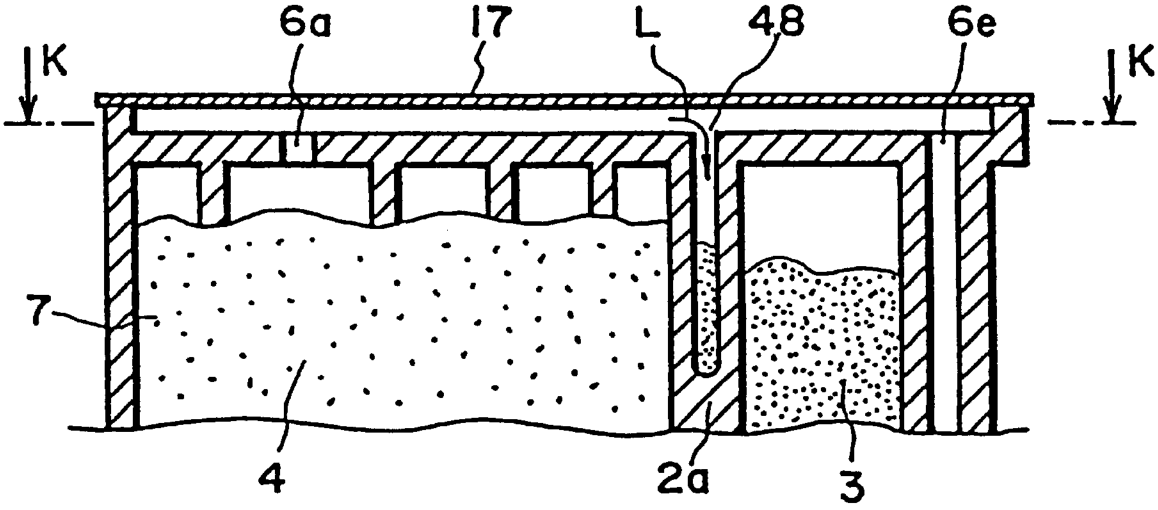
FIGS. 14 (*a*) & (*b*) are sectional views of a major part of an ink container according to a further embodiment of the present invention.
Figure 14B:
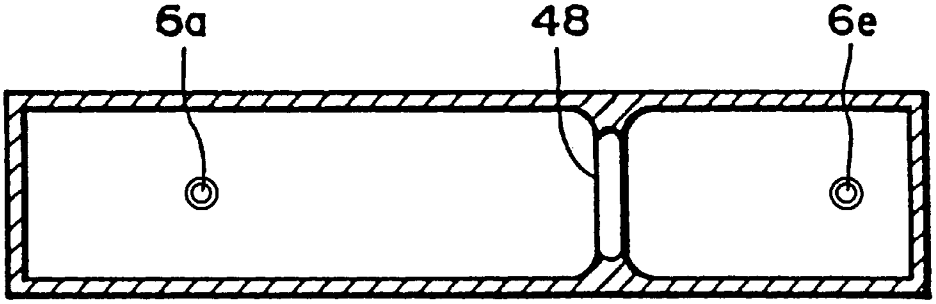

FIG. 14 shows a modified example of the top side region in the ambience communication structure according to Embodiment 9.

FIG. 14, (*a*) is a partial schematic sectional view of the air vent portion of the top side region, FIG. 14, (*b*) is a schematic view of of the section taken along the K–K in FIG. 14, (*a*).

In this embodiment, the structure as an ink trap, as ink collection portion 48 showed in Embodiment 2, is provided in a partition 2 for dividing into the ink retaining portion 4 and the negative pressure generation portion 3, and the ink moving toward the outside opening side is collected as indicated by an arrow L. By extending it into the partition 2*a*, the space can be used effectively, and therefore, the ink cartridge can be downsized while the introduced ink can be maintained.

By providing the ink trap portion in the passage of the air vent portion, the leakage of the ink to the outside can be suppressed, and the wet condition in the passage can be maintained to a certain degree, and therefore, the evaporation of the ink in the ink container can be suppressed.

(Embodiment 10)

Figure 15C:
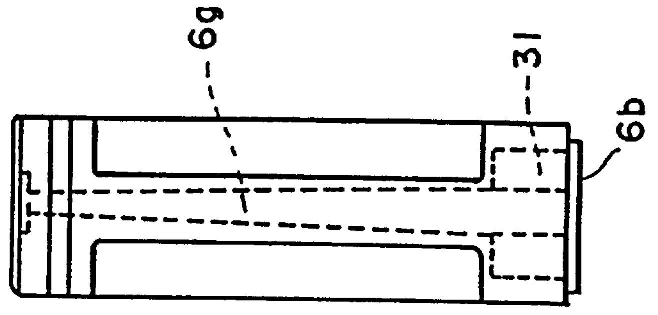
FIG. 15 is a sectional view of a major part of an ink container according to an embodiment of the present invention, wherein (*a*) is a sectional view, (*b*) is a top plan view (*c*) is a back side view.
Figure 15B:
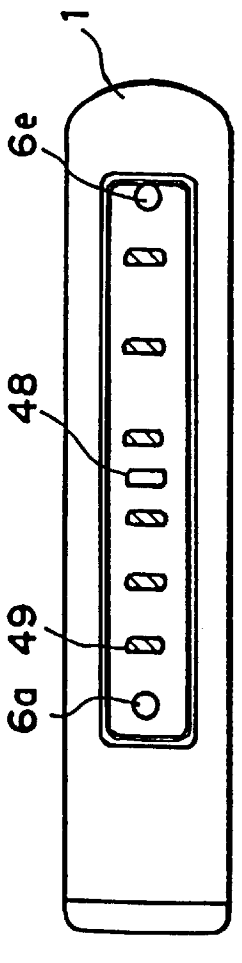
Figure 15A:
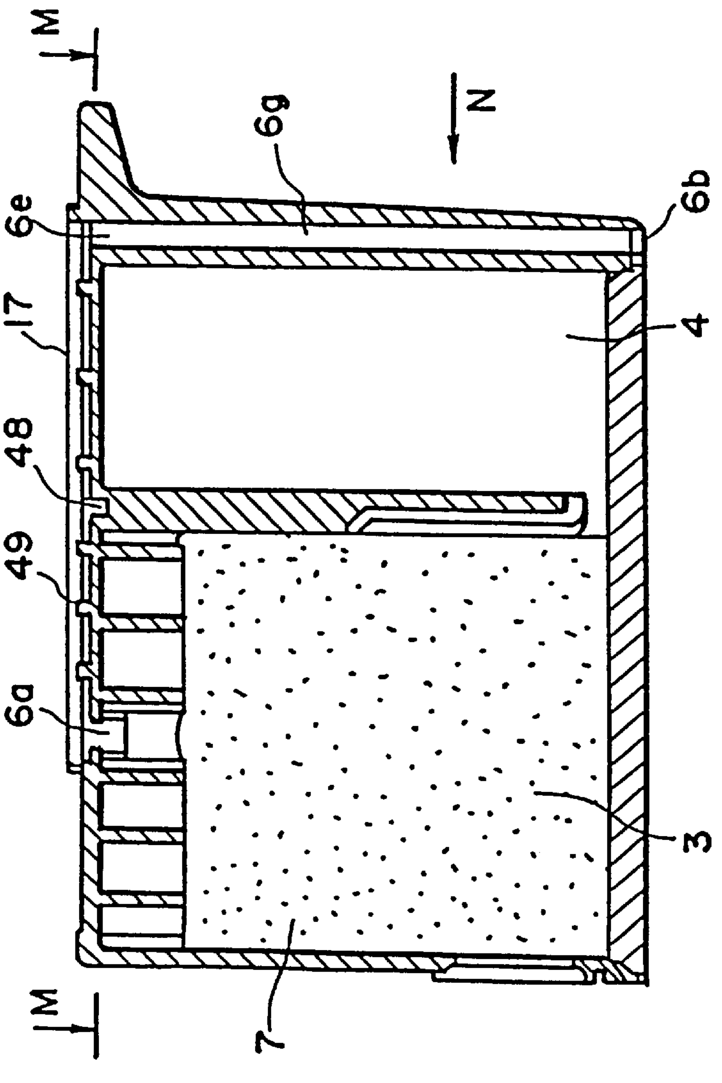

Embodiment 10 is a combination of the above-described embodiment or the modifications. FIG. 15, (*a*) is a schematic sectional view of the ink cartridge, and FIG. 15, (*b*) is a sectional view taken along a line M—M in FIG. 15, (*a*). FIG. 15, (*c*) shows an outer appearance thereof as seen from the rear (arrow N direction) in FIG. 15, (*a*).

In the structure of FIG. 15, the cross-sectional area of the air vent path in the side region along the side wall of the ink cartridge, is increased gradually toward the outside opening 6*b*, and there is provided a recess 31.

The air vent path of the top side region is provided with an ink collection portion 48 and projection 49 to change the flow path resistance of the portion extending from the inside opening 6*a* to the side region air vent path 6c to collect the ink and assure the ambience communication path. In this manner, the suppression of the ink evaporation and the suppression of the ink reaching to the end portion opening, are accomplished.

Further, by using the structure in the top side region, even if the ink reaches the end portion opening 6*e*, the amount thereof is so small that the ink leakage can be assuredly prevented by the cross-sectional area change portion 6*g*.

(Embodiment 11)

Figure 16:
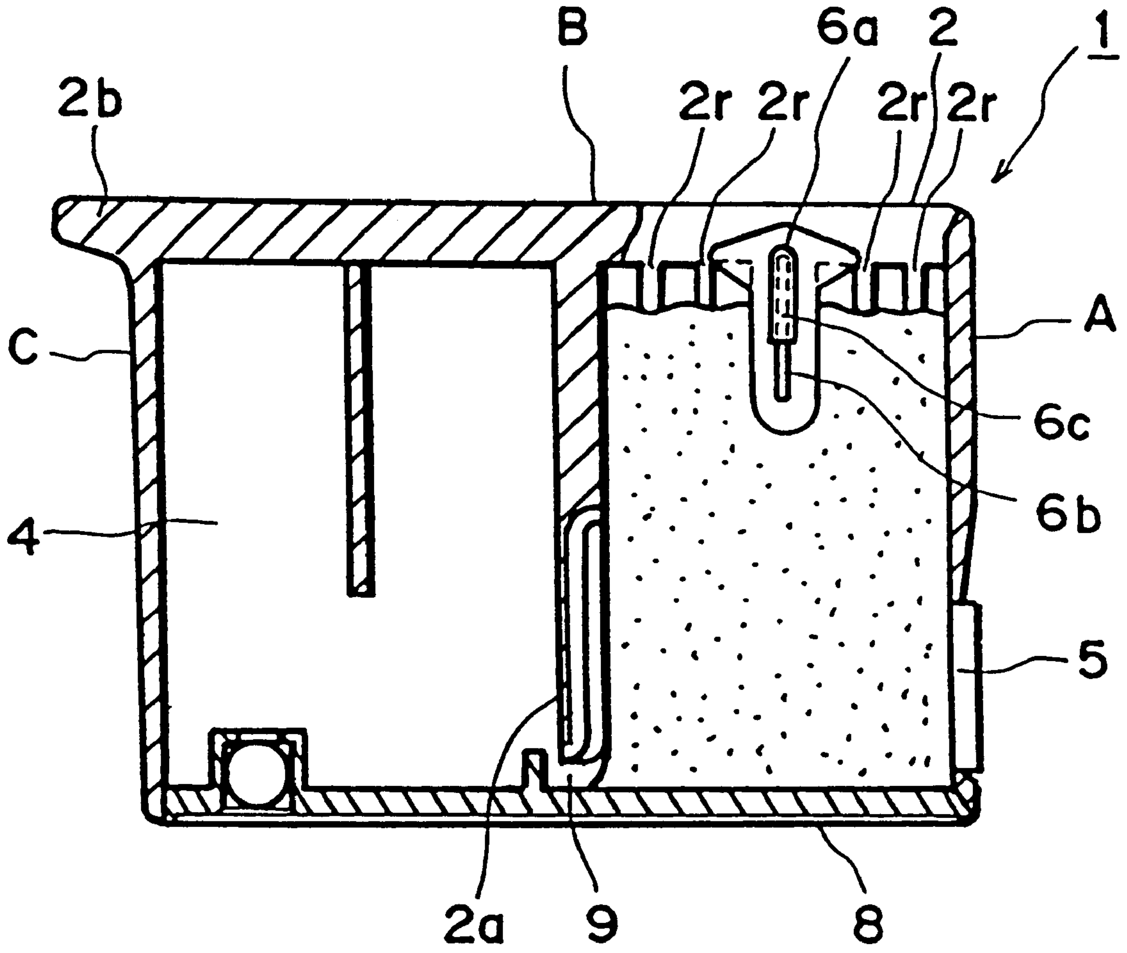
FIG. 16 is a sectional view of a major part of an ink container according to a further embodiment of the present invention.
Figure 17A:
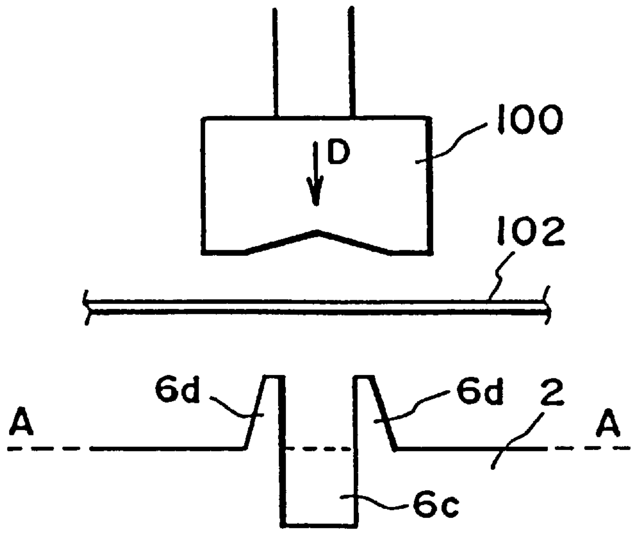
FIGS. 17, (*a*), (*b*), (*c*) are illustrations of manufacturing method of the ink container, and (*d*) and (*e*) show the air vent portion.
Figure 17D:
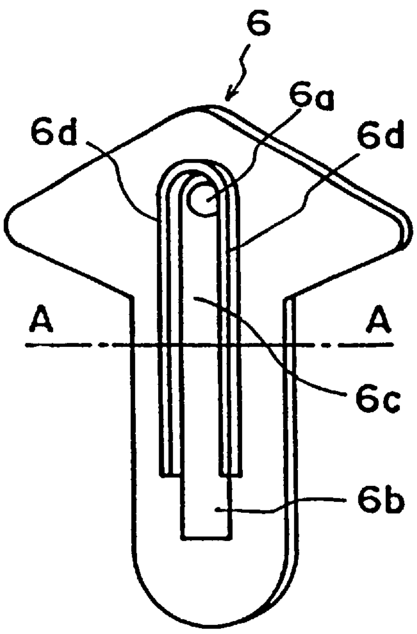
Figure 17B:
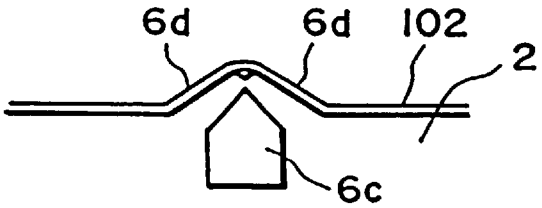
Figure 17E:
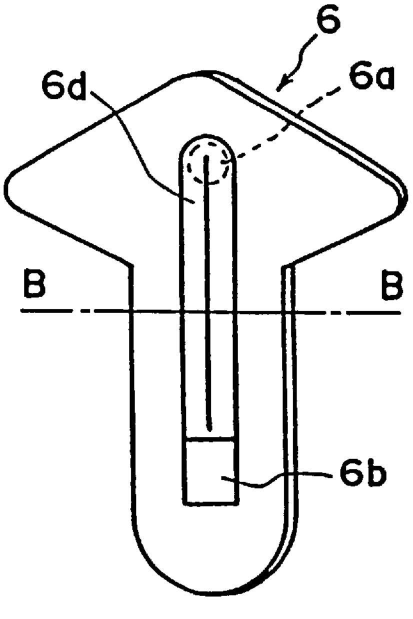
Figure 17C:
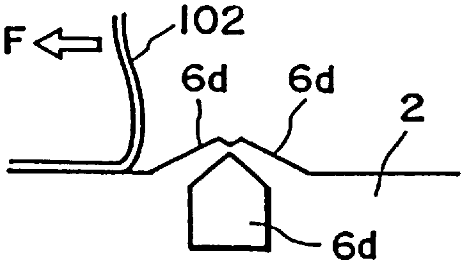

The structure of Embodiment 11 is, as shown in FIG. 16, such that the structure of the air vent 6 of Embodiment 1 is used in the lateral side of the ink container. In this embodiment, the structure of the opening end 6*a* at the inside has a rib 2*r* in the ink absorbing material chamber 3, but the structure of the opening end 6*a* is not limited to this, and it may be directly opened to the inside, as in Embodiment 1. When the air vent 6 is provided in the side surface of the ink container, the air vent 6 is positioned between the adjacent ink containers when it is mounted on an ink jet apparatus, thus preventing the entrance of the foreign matter such as.

Here, the description will be made as to manufacturing method of the ink container, particularly the portion of the air vent, showed in FIG. 2.

The air vent portion 6 of the ink container 1, as shown in FIG. 17, (*d*), has the groove 6*c* along the outer, wall of the ink container and the air vent path formation wall 6*d* except for the portion of the outside opening 6*b* around the groove.

It is possible to deform the air vent path formation wall 6*d* by welding alone, but in this embodiment, the sealing 102 of the outside opening 6*b* of the air vent portion 6 is simultaneously executed. As shown in FIG. 17, (*a*), a seal member 102 is interposed between a welding horn 100 and an air vent path formation wall 6*d* provided around the groove of the ink container. FIG. 17, (*d*) shows a section taken along a line A—A in FIG. 17, (*d*)). As shown in FIG. 17, (*b*), by the heat of the welding horn 100, the air vent path formation wall 6*d* collapses inwardly to provide a wall above the groove 6*c*. The seal member 102 can seal the outside opening 6*b* of the air vent portion simultaneously by the heat of the welding horn 100.

At this time, the air vent 6 and the ink supply port 5 exist on the same side of the ink container, and therefore, the welding of the seal member 102 can be accomplished simultaneously. As shown in FIG. 17, (*c*), the usable state is provided by peeling the seal member 102 off in the order of ambience opening 6 to the ink supply port 5. (FIG. 17, (*c*) is a section taken along a line B—B of FIG. 17, (*e*)).

FIG. 17, (*e*) shows the air vent 6 from which the seal member has been removed.

Figure 18:
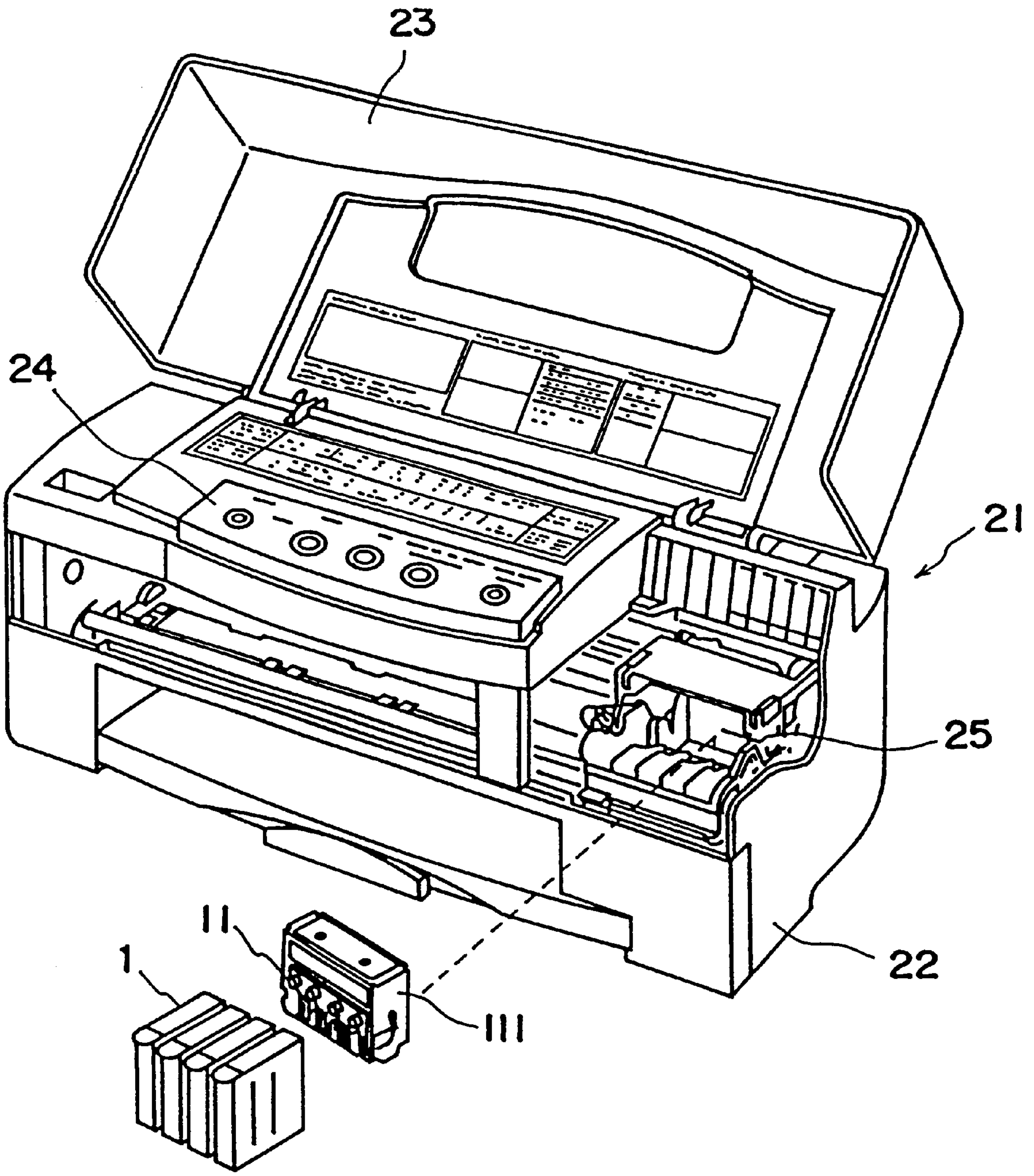
FIG. 18 is a perspective view of an ink jet apparatus to which the ink container is mounted.

The ink container 1 having the structure described in the foregoing, is mounted on the recording device 21 as shown in FIG. 18.

The recording device 21 showed in FIG. 18 is provided with a main assembly 22 of the device and a cover 23 covering the it. The main assembly is provided with an operating portion 24 having operation buttons and indication lamps, and a carriage 25 for carrying the ink container 1 and recording head 11 (four recording heads are constituted into a cartridge 111 structure for effecting color recording in this apparatus), the carriage 25 being scanningly movable in a recording region and non-recording region.

In this device, the ink droplet ejected through the recording head 11 is directed downward, that is, in the direction of the gravity. The droplets are deposited on the recording paper faced to the carriage and scanned by the carriage to form the image or letter.

The recording paper is supplied at the rear surface of the main assembly 22, and is transported to the from side. The position of the carriage shown in FIG. 6 is the home position, where the recording head cartridge 111 is exchanged, or the ink container 1 is exchanged. A the position corresponding the home position, there is provided a cap for covering the ejection side surface of the recording head 11, and it caps the ejection outlets during non-recording period. The cap is connected with refreshing means for maintaining and recovering the ejection state of the recording head 11, and the refreshing operation operations are effected at predetermined timing to maintain the quality of the recording.

When the recording is effected, the recording head cartridge 111 and ink container 1 are carried on the carriage, and the cover 23 is closed. Therefore, the scanning region by the carriage is substantially closed, and therefore, the paper dust produced from the carriage floats in the closed space.

However, in the ink container of the present invention, the paper dust does not easily enter the outside opening end of the air vent. Since the outside opening end is disposed below the inside opening end, the paper dust or the dust do not easily enter the inside of the fluid communication path connecting the inside opening end and the outside opening end. This is further promoted by inclining the outside opening end downwardly.

As described in the foregoing, the air vent particularly the outside opening end is disposed at a position where the paper dust does not easily enter, so that the opening is protected from being clogged by paper dust or dust.

By the positioning wherein the outside opening end is disposed below the inside opening end, or by the outside opening end is inclined downwardly, and therefore, the paper dust and the dust do not easily enter the fluid communication path connecting the inside opening end and the outside opening end. By the provision of the ink trap portion, the leakage of the ink to the outside can be suppressed, and the trapped ink is effective to wet the air vent path to prevent the evaporation of the inside ink.

The description will be made as to the packaging type of the ink cartridge described above.

Figure 19A:
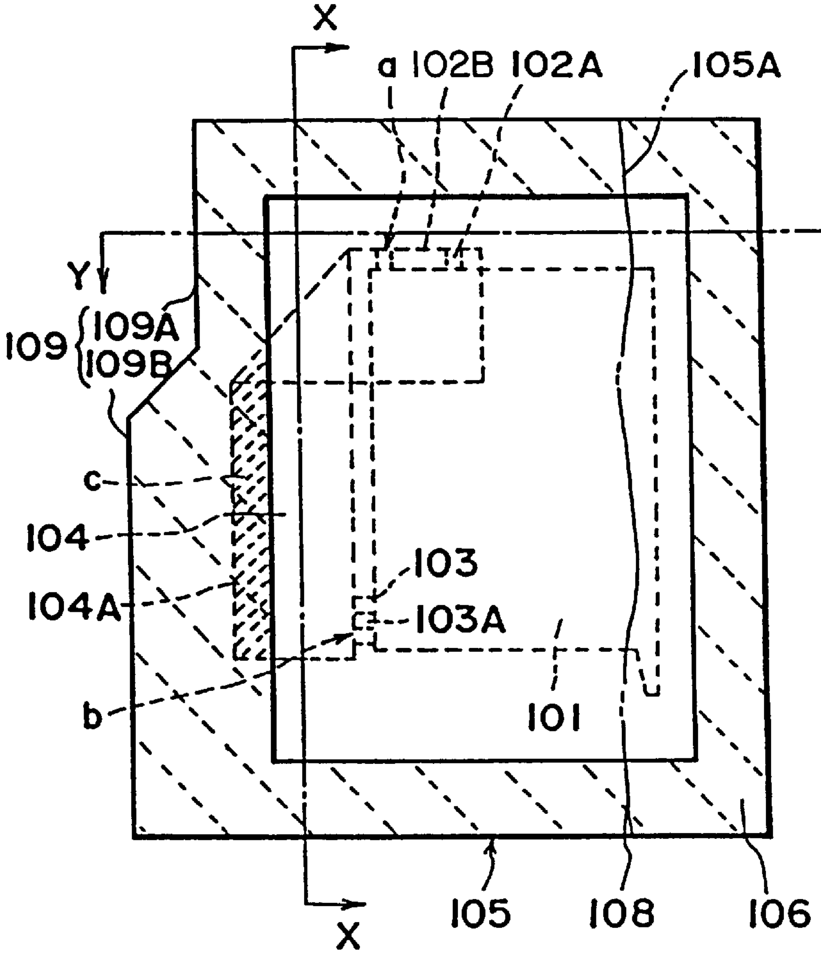
FIG. 19, (*a*) is a top plan view of an ink cartridge in a package, (*b*) is a sectional view taken along a line X—X line of (*a*), (*c*) is a sectional view taken along a line Y—Y line of (*a*).
Figure 19B:
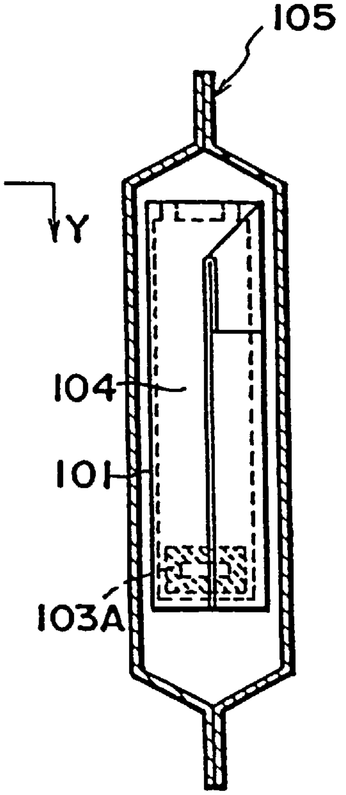
Figure 19C:
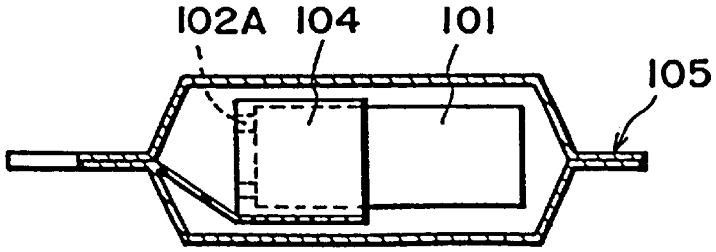
Figure 20A:
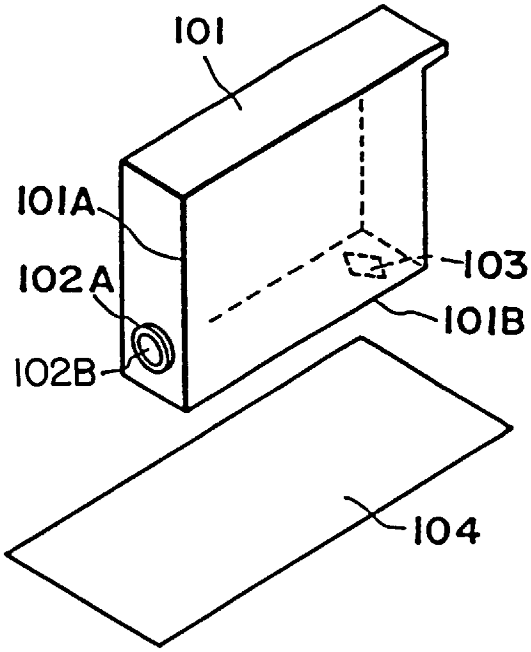
FIGS. 20, (*a*)–(*d*) show process steps of welding a seal member to an ink supply port and an air vent of a manin body.
Figure 20B:
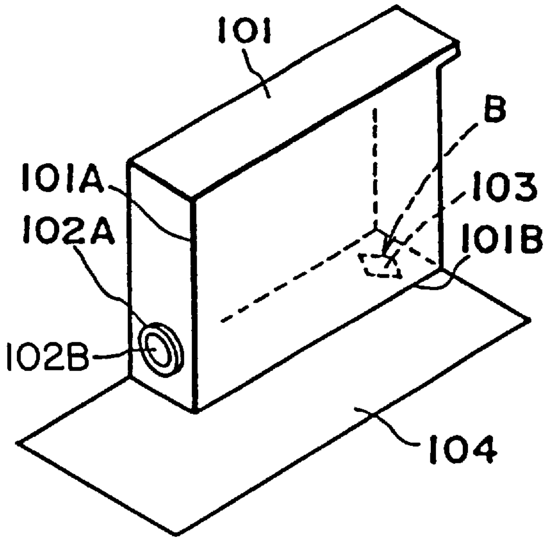
Figure 20C:
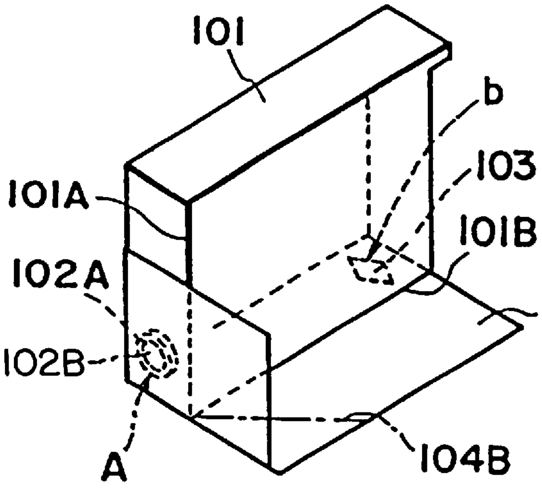
Figure 20D:
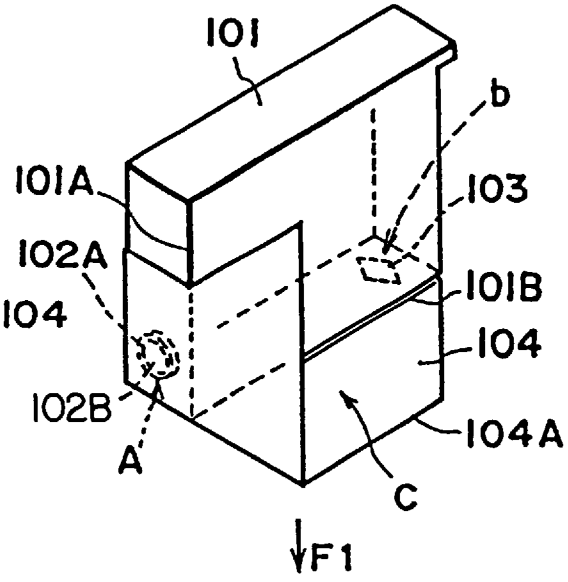

FIG. 19, (*a*) is a top plan view of an ink cartridge in a package, (*b*) is a sectional view taken along a line X—X line of (*a*), (*c*) is a sectional view taken along a line Y—Y line of (*a*).

In these Figures, designated by 101 is a main assembly of the ink cartridge; 102B is an ink supply port thereof; 103 is an air vent; 104 is a seal member sealing the ink supply port 102B and air vent 103; and 105 is a package for the entirety of the main assembly 101. The inside of the main assembly 101 contains the ink. In the case of this example, it comprises a negative pressure producing member accommodating portion for accommodating a negative pressure producing member for absorbing and retaining the ink and in fluid communication with the ink supply port 102B and the air vent 103, and an ink accommodating portion, for accommodating the ink, provided adjacent the negative pressure producing member accommodating portion.

Around each of the ink supply port 102B and the air vent 103, a cylindrical collar rib 102A and a rectangular collar rib 108A are formed. The ink supply port 102B has substantially the same diameter as the inside peripheral surface of the collar rib 102A, which is larger than the diameter of the air vent 108. The thickness of the collar rib 102A is larger than the thickness of the collar rib 103A, and to the end surface of the collar rib 102A, a seal member 4 is separably stuck, and to the end surface of the collar rib 103A, a seal member 4 is separably stuck. The former end surface is wider than the latter end surface.

On the other hand, the seal member 104 is of a barrier material having sufficient strength against tension or the like, and has sufficient flexibility. It may be of single layer structure or multi-layer structure of plastic resin material film, and preferably exhibits good welding property relative to the end surface of the collar rib 102A 103A. By the seal member 104, the ink supply port 102B and air vent 108 are sealed. The portion of the seal member 101 for sealing the ink supply port 102B is called “first sealing portion”, and the portion thereof for sealing the air vent 103 is called “second sealing portion”. The sealing portions of the seal member 104 will suffice if it can seal the ink supply port 102B and air vent 103 in the manner that it can withstand the expansion of the air or ink in the main assembly 101 and that the evaporation of the ink is prevented. It may be welded, crimped or bonded on the collar rib 102A 103A, and another method is usable. In order to assure the high reliability, it is preferable that use is made with a welding layer of the similar material as the main assembly 101 since then the weldability is improved. The upper part 410A of the seal member 104 is welded on the inside surface of the package 105, as will be described hereinafter. In the seal member 104, the hatched portion including the upper part 4A in FIG. 19, is called "operating portion".

The package 105 is in the form of a bag enclosing the entirety of the main assembly 101, and in this example, the outer periphery is welded, by which the bag form is constituted, and the operating portion c of the seal member 104 is welded with this portion 106. The package 105 will suffice if it is connectable with the operating portion c of the seal member 104 by crimping, bonding welding or the like. It may be of the material similar to the that of the seal member 104, or it may be a material generally used in the packaging field, such as paper. In this example, the welding layers of the seal member 104 and the package 105 are welded by heat and are made integral.

The description will be made as to mounting of the seal member 104.

FIGS. 20, (*a*)–(*d*) shows process step of welding the seal member 104 to the ink supply port 102B and the air vent 103 of the main assembly 101.

First, a flat seal member 104 as shown in FIG. 20, (*a*) is prepared. It is welded on the collar rib 103A of the air vent 103 at the bottom portion of the main assembly 101 to seal the air vent 103 (FIG. 20, (*b*)). Then, as shown in FIG. 20, (*c*), the seal member 104 is bent, and is welded on the collar rib 102A of the ink supply port 102B. Thereafter, the seal member 104 is folded along a line 104E as shown in FIG. 20, (*c*), and along lines 101A and 101B at the outside of the main assembly 101 (FIG. 20; (*d*)). After the main assembly 101 and the seal member 104 in this stage is packaged in a package 105, so that the state of FIG. 19 is established.

In such an ink cartridge, the ink supply port 102B and thp air vent 103 are on different sides of the main assembly 101. Therefore, when the force is applied in the direction arrow F1 in FIG. 20, (*d*), the second sealing portion for the air vent portion 103 is easily peeled off, but the first sealing portion for the ink supply port 102B receives the force in the shearing separation force and therefore is not easily peeled off.

The description will be made as to an unsealing of the ink cartridge.

Figure 21A:
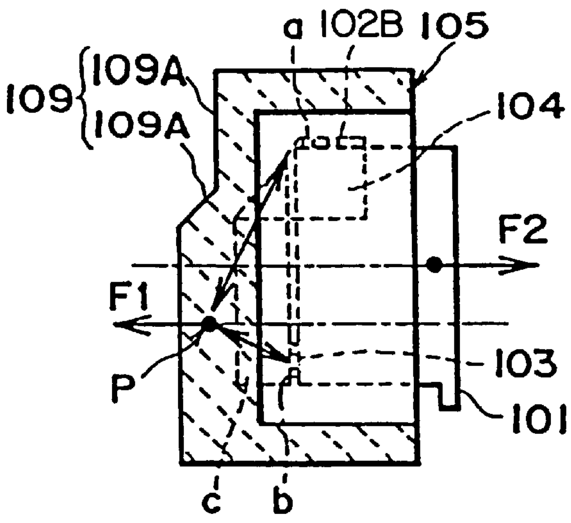
FIGS. 21, (*a*)–(*c*) are illustrations of the unsealing process for the ink cartridge of the present invention.
Figure 21B:
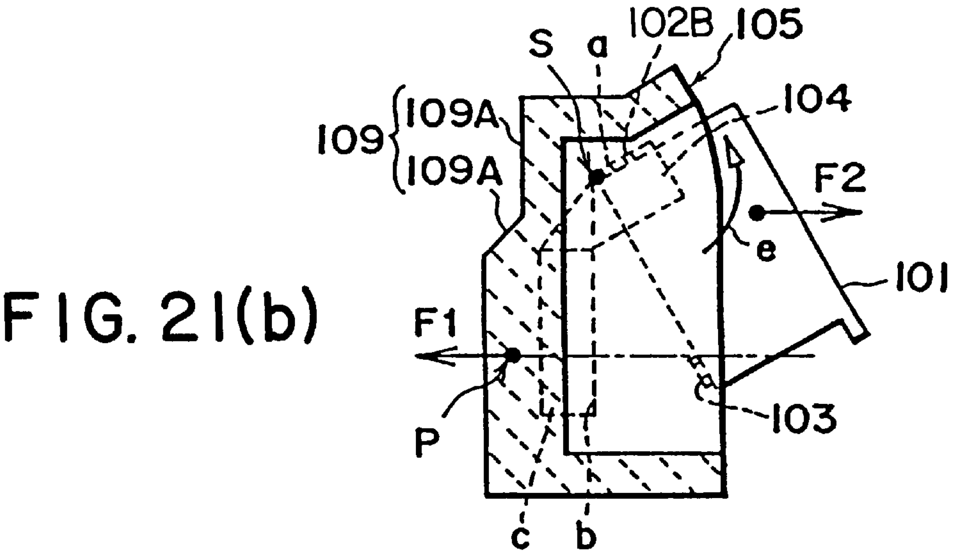
Figure 21C:
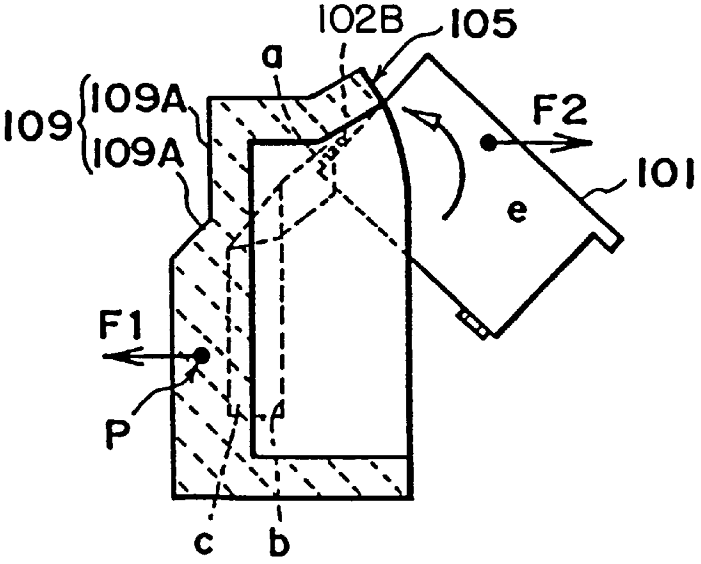

FIGS. 21, (*a*)–(*c*) are illustrations of the unsealing process for the ink cartridge of the present invention.

Prior to the peeling of the seal member 104, the package 105 is broken along the chain line 105A in the FIG. 19, (*a*) from the cutting away portion 108 to remove the right side portion of the package 105 in the same FIG. 19, (*a*). FIG. 21, (*a*) shows this state. The left side portion of the package 105 in FIG. 21, (*a*) is a ink scattering prevention portion for preventing the scattering of the ink, and the grip end 109 has a stepped portion 109A and 109B by cutting to facilitate user's handling. When the user applies the separation force in the direction arrow F1 by the grip portion 109B in the form of a projection to take the main assembly 101 out of the package 105, the working point of the separation force is closer to the air vent 108 than the ink supply port 102B. Therefore, the distance between the working point P and the second sealing portion b, is shorter than the distance between the wording point P and the first sealing portion a.

When the user grips the package 105 and the main assembly 101, and applies the separation force in the directions arrow F1 and F2, the first sealing portion is not easily peeled since it is remote from the working point P, and the separation force is in the leftward direction in FIG. 21, (*a*) namely in a direction perpendicular to the peeling-direction from the collar rib 102A (upward in FIG. 21, (*a*)). On the other hand, as to the second sealing portion b, it is close to the working point P, and the separation force is codirectional with the separating direction from the collar rib 103A (leftward direction in FIG. 21, (*a*)), and therefore, it is immediately peeled. Therefore, the second sealing portion b is separated earlier than the first sealing portion.

After the second sealing portion b is peeled, the main assembly 101 is moved away form the package 105 while rotating in the direction of arrow a about S point in the neighborhood of the first sealing portion a, as shown in FIG. 21, (*b*). Thus, the main assembly 101 rotates in the direction of arrow e, as shown in FIG. 21, (*c*) so that the separating direction of the first sealing portions from the collar rib 102A and the separating direction F1 become the same, that is, so as to facilitate the separating of the first sealing portion. With the rotation, the first sealing portion is separated.

As a result, the second sealing portion b is separated off the collar rib 103A before the first sealing portion is separated off the collar rib 102A. Thus, the air vent 103 is unsealed prior to the unsealing of the ink supply port 102B. The relation between the order of the unsealing and the scattering of the ink.

When the seal member 104 is separated, the main assembly 101 rotates, as shown in FIG. 21 rather than linear motion, and therefore, the problem due to the inertia force of the ink per se, that is, the ink leaks at the ink supply port 102B or the like as a result of the ink being unable to follow the quick linear movement of the main assembly 101 of the container, can be avoided. If this problem occurs, the users hands may be contaminated with the leaked ink.

The description applies to the ink container shown in FIG. 2.

While the invention has been described with reference to the structures disclosed herein, it is not confined to the details set forth and this application is intended to cover such modifications or changes as may come within the purposes of the improvements or the scope of the following claims.

What is claimed is:

1. A manufacturing method for an ink container mountable to an ink jet apparatus, comprising the steps of:

providing a main body of an ink container, the main body having an ink supply port and an air vent, wherein said air vent has an inside opening which opens to an inside of said ink container, a groove functioning as an outside opening and extending from said inside opening, and a wall provided except for a region functioning as said outside opening around said groove;

providing a seal member for sealing said ink supply port and said air vent;

positioning said seal member corresponding to said ink supply port and air vent of said main body;

collapsing the wall which is provided around said groove inwardly by a welding horn, with said seal member interposed between said welding horn and said wall; and welding the collapsed portion of the wall by said welding horn to cover the groove to form a fluid communication path for fluid communication between said inside opening and said outside opening while simultaneously welding the seal member.

2. A manufacturing method according to claim 1, wherein said collapsing step is carried out simultaneously with the step of welding said seal member.

* * * * *

UNITED STATES PATENT AND TRADEMARK OFFICE

CERTIFICATE OF CORRECTION

PATENT NO. : 6,302,532 B1
DATED : October 16, 2001
INVENTOR(S) : Hiroyuki Ishinaga et al.

It is certified that error appears in the above-identified patent and that said Letters Patent is hereby corrected as shown below:

Column 1,
Line 26, "supply" should read -- supplied --;
Line 27, "replace" should read -- replaced --;
Line 39, "propose" should read -- proposes --;
Line 55, "are" should read -- is --; and
Line 59, "of-the" should read -- of the --.

Column 2,
Line 6, "position (second occurrence) should be deleted;
Line 14, "change," should read -- change --;
Line 15, "temperature," should read -- temperature --;
Line 27, "vent," should read -- vent --; and
Line 42, "an" should read -- a --.

Column 4,
Line 14, "of of" should read -- of --;
Line 25, "a" (first occurrence) should read -- an --;
Line 50, "is" should read -- is a --; and
Line 67, "view." should read -- views --.

Column 5,
Line 8, "view" should read -- views --;
Line 43, "manin" should read -- main --; and
Line 57, "to" should read -- into --.

Column 6,
Line 27, "to" should read -- so --;
Line 40, "of of" should read -- of --;
Line 52, "another dust do" should read -- other dust does --;
Line 61, "a should read -- an --; and "surf ace" should read -- surface --.

UNITED STATES PATENT AND TRADEMARK OFFICE
CERTIFICATE OF CORRECTION

PATENT NO. : 6,302,532 B1 
DATED : October 16, 2001
INVENTOR(S) : Hiroyuki Ishinaga et al.

It is certified that error appears in the above-identified patent and that said Letters Patent is hereby corrected as shown below:

Column 7,
Line 2, "recording," should read -- recording --;
Line 4, "his" should read -- their --;
Line 19, "open" should read -- opening --;
Line 24, "to" should be deleted;
Line 35, "seal 7," should read -- seal 17, --; and
Line 42, "to to" should read -- to --.

Column 8,
Line 14, "entirety" should read -- entire --;
Line 30, "move," should read -- moves --;
Line 39, "eve" should read -- even --;
Line 49, "in." should read -- in --; and
Line 50, "a" should read -- an --.

Column 9,
Line 13, "to" should be deleted;
Line 14, "size" should read -- a size --; and
Line 15, "to between" should read -- between --.

Column 10,
Line 21, "of of" should read -- of --;
Line 24, "showed" should read -- shown --; and
Line 54, "to" should be deleted.

Column 11,
Line 5, "such as" should read -- as such. --;
Line 8, ""showed" should read -- shown --;
Line 10, "outer," should read -- outer --;
Line 38, "showed" should read -- shown --;
Line 40, "the it." should read -- it. --;
Line 53, "from" should be deleted;
Line 56, A" should read -- At --;
Line 57, "corresponding" should read -- corresponding to --; and
Line 62, "operation" should be deleted.

UNITED STATES PATENT AND TRADEMARK OFFICE

CERTIFICATE OF CORRECTION

PATENT NO. : 6,302,532 B1 
DATED : October 16, 2001
INVENTOR(S) : Hiroyuki Ishinaga et al.

It is certified that error appears in the above-identified patent and that said Letters Patent is hereby corrected as shown below:

Column 12,
Line 6, "do" should read -- does --.

Column 13,
Line 24, "shows" should read -- show a --;
Line 35, "and" should be deleted;
Line 37, "thp" should read -- the --;
Line 53, "a" should read -- an --;
Line 55, "a stepped portion" should read -- stepped portions --; and
Line 66, "tions arrow" should read -- tion arrows --.

Column 14,
Line 2, "peeling-direction" should read -- peeling direction --.

Signed and Sealed this

Eighteenth Day of June, 2002

*Attest:*

JAMES E. ROGAN

*Attesting Officer* *Director of the United States Patent and Trademark Office*